US010921909B2

(12) United States Patent
Ushiku et al.

(10) Patent No.: US 10,921,909 B2
(45) Date of Patent: Feb. 16, 2021

(54) INPUT TOUCH PEN

(71) Applicant: MITSUBISHI PENCIL COMPANY, LIMITED, Tokyo (JP)

(72) Inventors: Shinichi Ushiku, Tokyo (JP); Tsuyoshi Nishida, Tokyo (JP); Kyo Nakayama, Tokyo (JP); Satoru Okabe, Tokyo (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/641,804

(22) PCT Filed: Aug. 30, 2018

(86) PCT No.: PCT/JP2018/032262
§ 371 (c)(1),
(2) Date: Feb. 25, 2020

(87) PCT Pub. No.: WO2019/045018
PCT Pub. Date: Mar. 7, 2019

(65) Prior Publication Data
US 2020/0218371 A1   Jul. 9, 2020

(30) Foreign Application Priority Data

Sep. 1, 2017  (JP) ................................. 2017-168701
Nov. 28, 2017  (JP) ................................. 2017-228206

(51) Int. Cl.
*G06F 3/033*   (2013.01)
*G06F 3/0354*   (2013.01)
(Continued)

(52) U.S. Cl.
CPC .......... *G06F 3/03545* (2013.01); *B43K 5/005* (2013.01); *B43K 24/08* (2013.01)

(58) Field of Classification Search
CPC ...... B43K 24/08; B43K 5/005; G06F 3/03545
See application file for complete search history.

(56) References Cited

U.S. PATENT DOCUMENTS

2009/0076770 A1* 3/2009 Fukushima ............. G06F 3/044
702/150
2010/0177063 A1* 7/2010 Altman ................. G06F 3/0483
345/179

FOREIGN PATENT DOCUMENTS

JP    2009-086925 A    4/2009
WO   2016/031329 A1   3/2016
WO   2016/185915 A1   11/2016

OTHER PUBLICATIONS

International Search Report dated Oct. 2, 2018, issued in counterpart International Application No. PCT/JP2018/032262 (1 page).

\* cited by examiner

*Primary Examiner* — Insa Sadio
(74) *Attorney, Agent, or Firm* — Westerman, Hattori, Daniels & Adrian, LLP

(57) ABSTRACT

An input touch pen includes a digitizer refill contained inside a shaft tube and including a contact tip and a stepped tip portion rearward thereof, and a knock member protruding from an opening at a rear end of the shaft tube. The contact tip can protrude and retract through an opening at a tip end of the shaft tube. The stepped tip portion has a larger diameter than the opening at the tip end. A relationship A>X>Y is satisfied, wherein X represents a knock stroke of the digitizer refill, A a distance from the stepped tip portion to an inner surface at the tip end side when the contact tip is sunken inside the opening, and Y a distance that the contact tip is moved by operation of the knock member from a state of protruding from the opening to a state of being sunken inside the opening.

6 Claims, 38 Drawing Sheets

(51) Int. Cl.
*B43K 5/00* (2006.01)
*B43K 24/08* (2006.01)

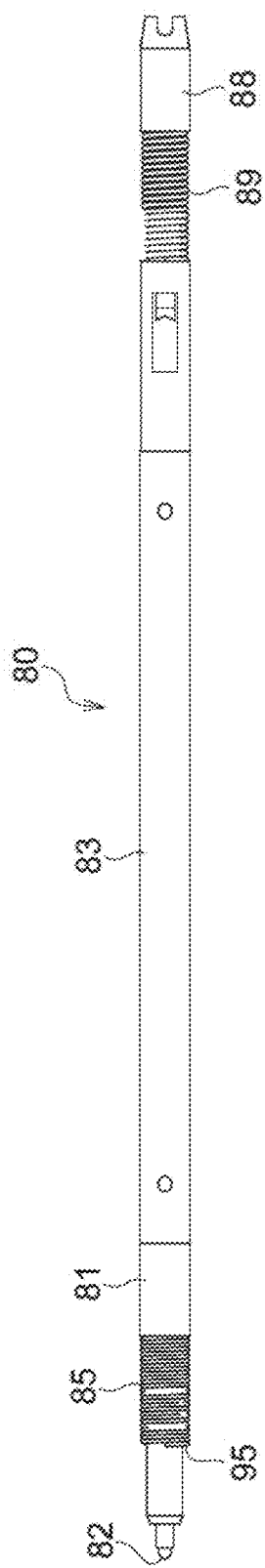

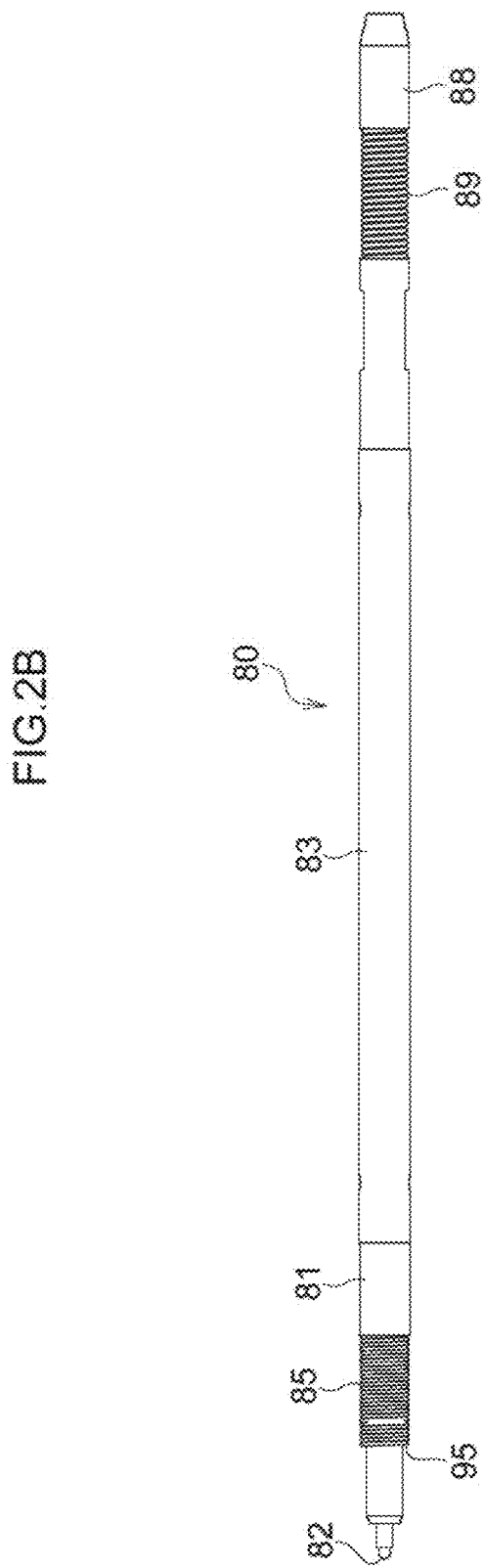

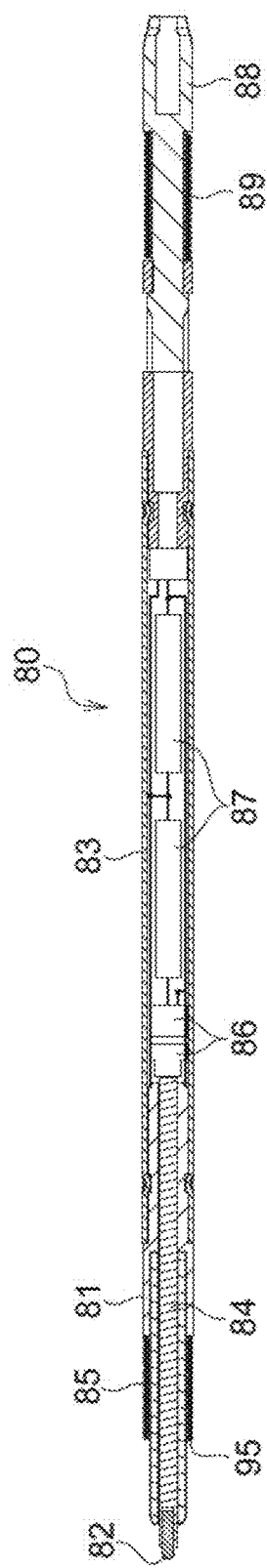

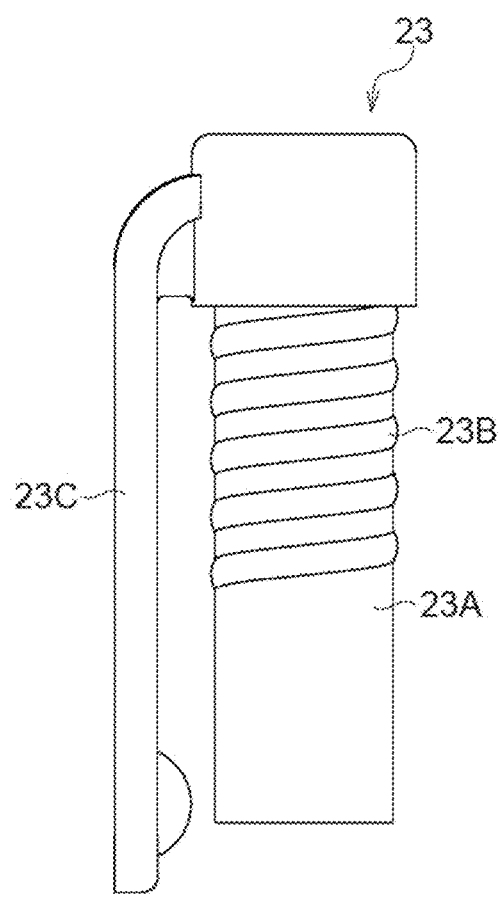

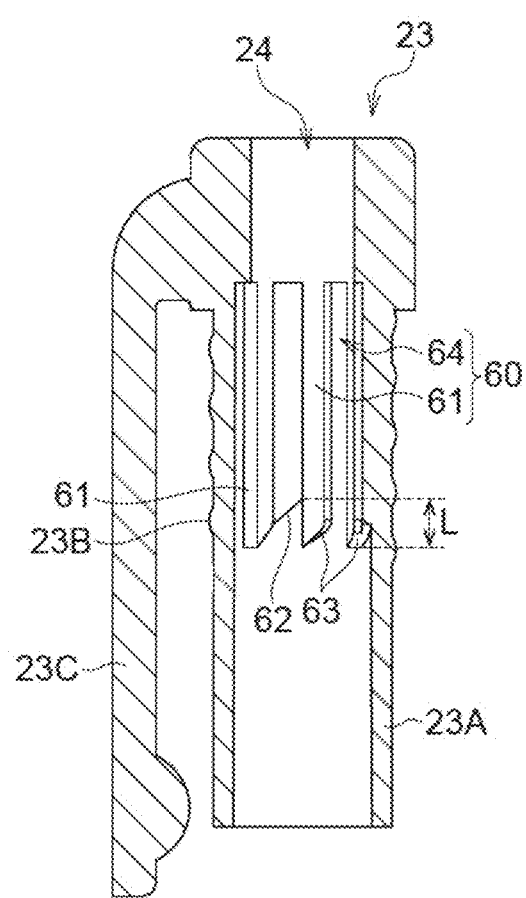

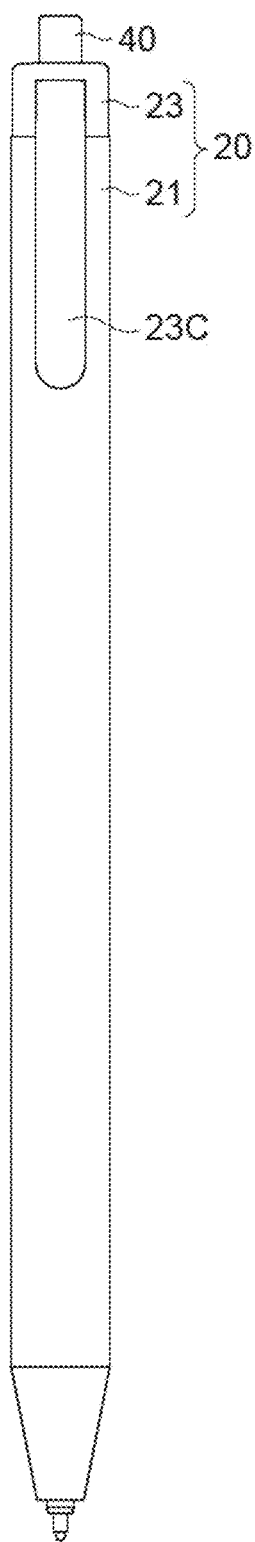

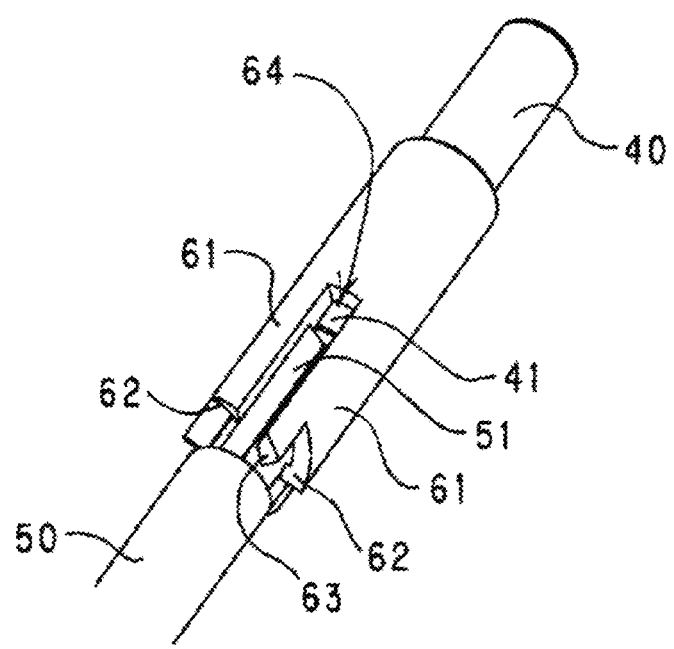

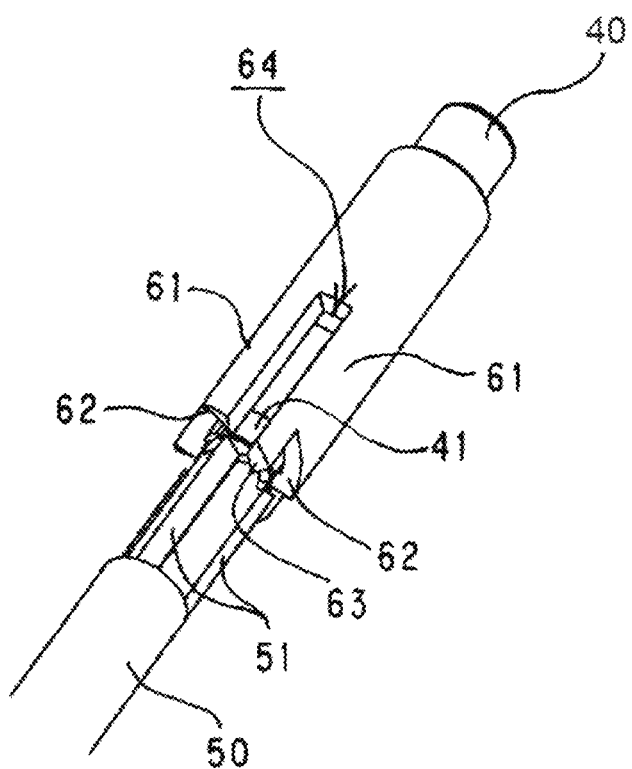

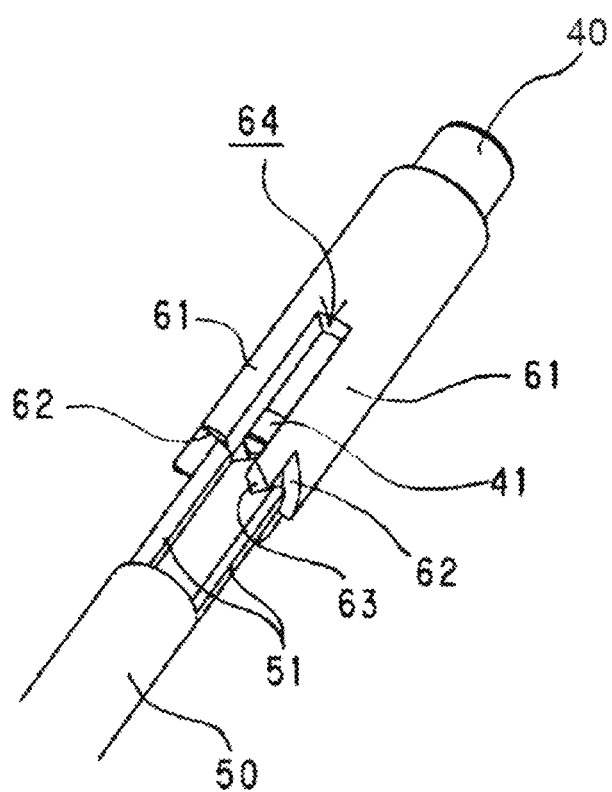

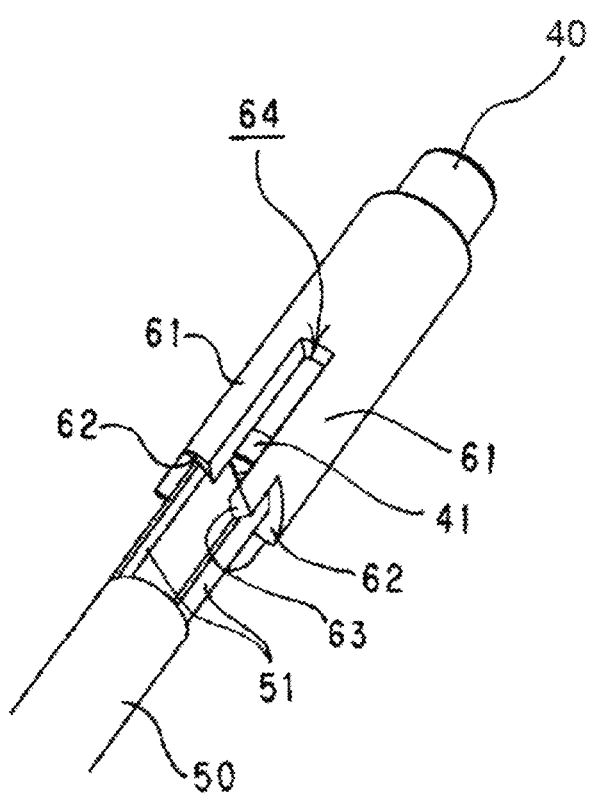

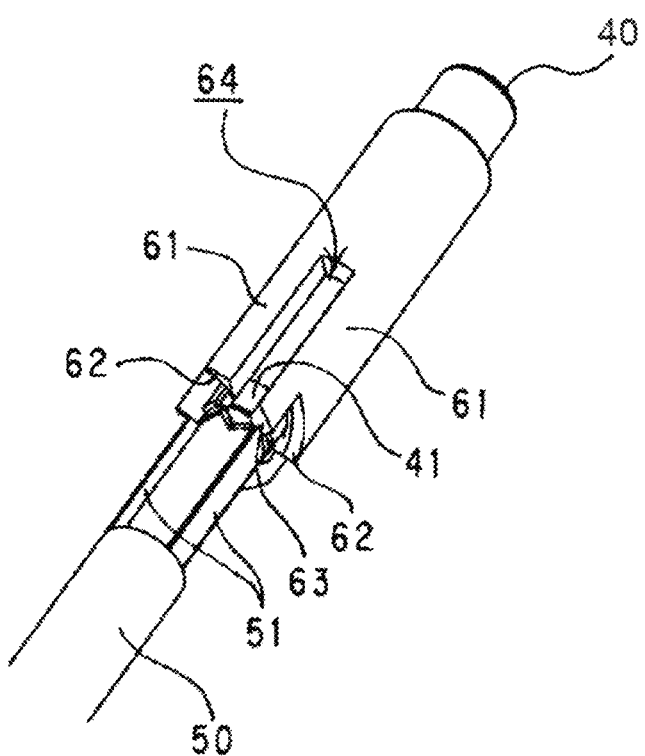

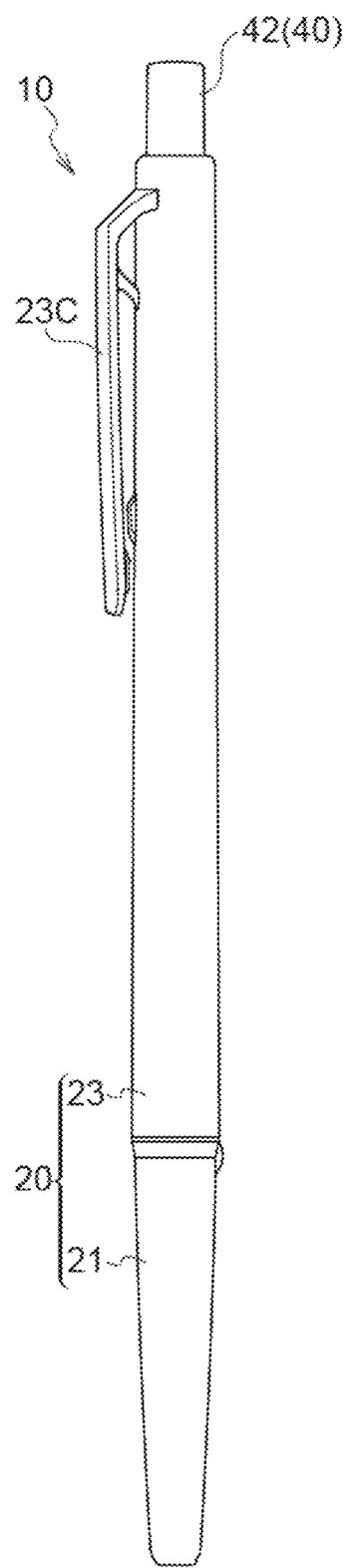

US 10,921,909 B2

INPUT TOUCH PEN

TECHNICAL FIELD

The present invention relates to an input touch pen including a shaft tube equipped with a knock mechanism.

BACKGROUND ART

In recent years, pointing devices such as digitizers and the like have been widely used for input by physical contact with a screen surface. That is, a position indicator formed in a pen shape makes contact with an input surface of a plate-shaped input device, at which a position detection apparatus is provided, and contact positions are detected.

Various systems are available for this digitizer, including an electromagnetic induction system. In an electromagnetic induction system, an electromagnetic induction coil resonates with electromagnetic waves at a particular frequency that are generated by a position detection apparatus disposed beneath the input surface of the input device. A position at which this resonance occurs is identified as an input position.

The electromagnetic induction coil mentioned above is a coil wound around a magnetic core.

In a conventional position detection device, a core body fabricated of resin penetrates through a tubular ferrite core, a tip end of the core body touches against an input surface, and a coil is wound round the tubular ferrite core (Japanese Patent Application Laid-Open No. 2009-86925), or a tip portion of a rod-shaped ferrite core is covered with resin in a pen tip shape and the core is wound round a portion to the rear of the tip portion (WO 2016/031329 A1), or the like.

SUMMARY OF INVENTION

Technical Problem

When a digitizer with an electromagnetic induction system as described above is formed as a refill and is contained in a shaft tube to form an electromagnetic induction touch pen that is "retractable", with an input portion protruding from and retracted into the shaft tube by a manual operation, a structure in which a coil or the like is provided at an outer surface of the refill is at risk of being damaged by a knock operation. Even when a digitizer does not have an electromagnetic induction system (for example, an electrostatic capacitance system, a pressure-sensing system or the like), it is obviously better to avoid impacts in knock operations, falls and the like.

Accordingly, an object of the present invention is to provide an input touch pen that may prevent damage to a digitizer refill at a time of knock operation, enables easy protrusion and retraction of a tip end, may protect the tip end when not in use, and may protect the digitizer refill from fall impacts.

Solution to Problem (1) First Aspect

In consideration of the object described above, a first aspect of the present invention is an input touch pen, comprising:

a shaft tube including an opening at each of a tip end and a rear end;

a digitizer refill that is contained inside the shaft tube and includes a contact tip that can protrude and retract through the opening at the tip end; and a knock mechanism including a knock member that protrudes from the opening at the rear end, wherein:

the knock mechanism includes a return spring that continuously urges the knock member rearward relative to the shaft tube, a rear portion of the digitizer refill is fixed to the knock mechanism, a stepped tip portion is formed rearward of the contact tip of the digitizer refill, the stepped tip portion having a larger diameter than an outer diameter of the contact tip and a larger diameter than the opening at the tip end of the shaft tube, and the relationship A>X>Y is satisfied, wherein:

X represents a maximum knock stroke of the digitizer refill,

A represents a distance in an axial direction from the stepped tip portion to an inner surface at a tip end side of the shaft tube in a state in which the contact tip is retracted inside the opening at the tip end, and Y represents a distance that the contact tip is moved by operation of the knock member from a state in which the contact tip protrudes from the opening at the tip end, to the state in which the contact tip is retracted inside the opening at the tip end.

The input touch pen according to the present aspect contains the digitizer refill in the shaft tube, and the contact tip of the digitizer refill may be operated by the knock mechanism provided at the shaft tube side. In the present aspect, the "tip end" refers to the side of the input touch pen at which the contact tip is disposed and "front" refers to the direction toward the tip. The "rear end" refers to an opposite side from the "tip end" and "rear" refers to an opposite direction from "front".

The digitizer refill may employ any of various input systems, such as an electromagnetic induction system, an electrostatic capacitance system, a pressure-sensing system or the like.

The shaft tube is a member that configures an outside of the input touch pen, and is formed to enable installation of the digitizer refill. It is desirable if for example, the shaft tube is structured by screwing together two members at the tip end side and the rear end side, which may be disassembled to enable installation or replacement of the digitizer refill. Respective openings are provided at both ends of the shaft tube. The contact tip, which is described below, can protrude and retract through the opening at the tip end side. A portion of the knock mechanism, which is described below, can protrude and retract through the opening at the rear end side.

The knock mechanism is a mechanism for operating the contact tip of the digitizer refill. Specifically, the contact tip protrudes and retracts through the opening at the tip end side by operation of the knock mechanism.

The knock mechanism is a mechanism that includes the knock member, which is a separate member from the shaft tube, and the return spring, which continuously urges the knock member to the rear relative to the shaft tube, as structures thereof.

The knock member is a member to protrude and to retract repeatedly through the opening at the rear end of the shaft tube by pressing a structure sometimes referred to as a "knock button" or the like, which usually configures a rearmost end portion of the knock member, whereby protrusion and retraction of the contact tip is operated.

Thus, in the present aspect, no part of the configuration that contributes to the knock mechanism is provided at the digitizer refill.

The stepped tip portion is formed in a vicinity of the tip end of the digitizer refill. The stepped tip portion has a larger diameter than the outer diameter of the contact tip and than the opening at the tip end of the shaft tube.

The above-mentioned symbol "A" represents the distance in the axial direction from the stepped tip portion to the inner surface at the tip end side of the shaft tube in the state in which the contact tip is retracted inside the opening at the tip end of the shaft tube (in other words, a state in which the contact tip does not protrude from the opening at the tip end of the shaft tube).

The symbol "X" represents the knock stroke of the digitizer refill, that is, the maximum distance that the knock member is moved forward in a single knock in order for the contact tip to protrude. The symbol "Y" represents either a distance that the contact tip is moved by operation of the knock member from the state in which the contact tip protrudes from the opening at the tip end, to the state in which the contact tip is retracted inside the opening at the tip end, or, a distance that the knock member is moved rearward from the state in which the knock member is pressed inside the shaft tube while the contact tip protrudes from the opening at the tip end, to a state in which the contact tip is retracted inside the opening at the tip end. That is, in the state in which the contact tip protrudes from the opening at the tip end, the knock member has been moved forward relative to the state in which the contact tip is retracted inside the opening at the tip end, and the distance of this forward movement is Y. However, the knock stroke is specified such that the knock member may be pressed in by a distance somewhat longer than the distance Y of the movement of the knock member, and this distance is X. Therefore, X is inherently greater than Y.

In the present aspect, the above mentioned distances A, X and Y satisfy the relationship A>X>Y. What this means is that when the knock member is moved forward by the distance X, the contact tip of the digitizer refill is not moved by the distance A, and therefore the stepped tip portion does not come into contact with the interior of the tip end of the shaft tube.

(2) Second Aspect

In consideration of the object described above, a second aspect of the present invention is an input touch pen, comprising:

a shaft tube including an opening at each of a tip end and a rear end;

a digitizer refill that is contained inside the shaft tube and includes a contact tip that can protrude and retract through the opening at the tip end; and a knock mechanism including a knock member that protrudes from the opening at the rear end, wherein: the knock mechanism includes the knock member, a rotary member that is disposed at a tip end side of the knock member and is rotatable in a predetermined circumferential direction in association with pressing of the knock member, a cam mechanism provided at an inner peripheral surface in a vicinity of the rear end of the shaft tube, and a return spring that continuously urges the rotary member rearward;

the knock member includes a sliding projection protruding from an outer surface of the knock member;

the rotary member includes a sliding ridge protruding from an outer surface of the rotary member, the sliding ridge extending in an axial direction, and a rear end edge of the sliding ridge being inclined in an opposite direction from a rotation direction of the rotary member;

the cam mechanism includes:

a plurality of engaging ridges protruding inward from the inner peripheral surface in the vicinity of the rear end of the shaft tube, the engaging ridges extending in the axial direction and being equally distributed, and a cam groove formed as a groove between the plurality of engaging ridges, the sliding projection and the sliding ridge are slidable forward and rearward in the axial direction in the cam groove, a portion of a tip edge of the engaging ridge that is disposed at a rotation direction side of the cam groove is formed as an engaging edge that is inclined toward the rear end in the rotation direction and that is engageable with a rear end edge of the sliding ridge, a portion of a tip edge of the engaging ridge that is disposed at an opposite side from the rotation direction side of the cam groove is formed as a guide edge that is closer to the tip end than the engaging edge, that is inclined toward the rear end in the rotation direction, and that guides the sliding ridge into the cam groove, a stepped tip portion is formed in a vicinity of a tip end of the digitizer refill, the stepped tip portion having a larger diameter than an outer diameter of the contact tip and a larger diameter than the opening at the tip end of the shaft tube, and the relationships A>X and B>L are satisfied, wherein L represents a distance from a rear end of the engaging edge to a tip end of the guide edge, X represents a maximum knock stroke of the digitizer refill, A represents a distance in the axial direction from the stepped tip portion to an inner surface at a tip end side of the shaft tube in a state in which the contact tip is retracted inside the opening at the tip end, and B represents a distance in the axial direction from the stepped tip portion to the inner surface at the tip end side of the shaft tube in a state in which the contact tip protrudes from the opening at the tip end.

The shaft tube and digitizer refill of the input touch pen according to the present aspect are similar to the first aspect.

The knock mechanism is a mechanism for operating the contact tip of the digitizer refill. Specifically, the contact tip protrudes and retracts through the opening at the tip end side by operation of the knock mechanism.

The knock mechanism is a mechanism that includes the cam mechanism, which is a structure provided at the shaft tube side, and the knock member, rotary member and return spring, which are separate members from the shaft tube, as structures thereof. The cam mechanism may be formed integrally with an inner peripheral surface of the shaft tube, and may be formed as a separate member that is inserted into, and fixed to a corresponding position of the inner peripheral surface of the shaft tube.

The cam mechanism includes engaging ridges, which are protrusions that protrude inward from the inner peripheral surface in the vicinity of the rear end of the shaft tube, and cam grooves, which are grooves that are present where the engaging ridges are formed. The tip edge of each engaging ridge is inclined relative to a given direction relative to the circumference of the shaft tube. A portion of the engaging ridge at the given direction side thereof is disposed toward the tip side relative to a portion of the engaging ridge at the opposite direction side. Thus, the tip edge of the engaging ridge is formed such that when viewed in the given direction, a cam groove is followed first by a portion (the engaging edge) disposed to the rear side, next by a portion (the guide edge) disposed to the front side, and then by the next cam groove.

The knock member is a member to protrude and to retract repeatedly through the opening at the rear end of the shaft tube by pressing a structure sometimes referred to as a "knock button" or the like, which usually configures a rearmost end portion of the knock member, whereby protrusion and retraction of the contact tip is operated. Sliding projections that slide along the cam grooves are provided at an outer peripheral surface of the knock member. The function thereof is described below.

The rotary member is a member formed so as to rotate in the given direction mentioned in the description of the cam groove when pushed by pressing of the knock member. The sliding ridges are provided at the rotary member. The sliding ridges slide along the cam grooves and can be engaged with the engaging edges. It is desirable if the digitizer refill can be mounted to a tip portion of the rotary member. A method of this mounting may be, for example, providing a refill mounting hole at an axial central portion of the rotary member and mounting by pressing a rear end of the digitizer refill into the refill mounting hole, or may be providing a projecting structure at the axial center of the rotary member and mounting by pressing the projecting structure into an aperture or small hole provided in the rear end of the digitizer refill. The digitizer refill need not be mounted directly to the rotary member but may, for example, be mounted indirectly via a given member therebetween.

Thus, in the present aspect, no part of the configuration that contributes to the knock mechanism is provided at the digitizer refill.

The stepped tip portion is formed in the vicinity of the tip end of the digitizer refill. The stepped tip portion has a larger diameter than the outer diameter of the contact tip and than the opening at the tip end of the shaft tube.

The above-mentioned symbol "A" represents the distance in the axial direction from the stepped tip portion to the inner surface at the tip end side of the shaft tube in the state in which the contact tip is retracted inside the opening at the tip end of the shaft tube (in other words, a state in which the contact tip does not protrude from the opening at the tip end of the shaft tube).

The above-mentioned symbol "B" represents a distance in the axial direction from the stepped tip portion to the inner surface at the tip end side of the shaft tube in the state in which the contact tip protrude from the opening at the tip end of the shaft tube.

Thus, A is inherently greater than B.

In this cam mechanism, "L" represents a distance between a rear end of the engaging edge of the engaging ridge (that is, a point of the engaging edge that is disposed closest to the rear end) and a tip end of the guide edge (that is, a point of the guide edge that is disposed closest to the tip end). That is, the symbol L means a distance over which each sliding projection has to move in the cam mechanism from the state in which the contact tip protrudes to the state in which the contact tip is retracted.

The symbol "X" represents the knock stroke of the digitizer refill, that is, the maximum distance that the knock member is moved forward in a single knock in order for the contact tip to protrude.

Thus, X is inherently greater than L.

In the present aspect, the above mentioned distances A, B, L and X satisfy the relationships A>X and B>L. What this means is described below.

When the digitizer refill is installed in the shaft tube, the sliding ridge of the rotary member is either disposed in the cam groove, or is engaged at the engaging edge of the engaging ridge.

First, if the sliding ridge of the rotary member is disposed in the cam groove, the contact tip does not protrude from the tip end of the shaft tube directly after installation. In this state, the distance from the stepped tip portion of the digitizer refill to the inner surface at the tip end side of the shaft tube is the aforementioned distance A.

When the knock member is pressed in this state, the sliding projection disposed in the cam groove pushes the sliding ridge disposed just in front thereof forward in the cam groove. Thus, the rotary member is pushed forward.

When the sliding ridge is pushed beyond the tip end of the engaging ridge, the sliding projection is engaged with the engaging edge along an inclination of the engaging edge of the engaging ridge. Accordingly, the rotary member rotates by an amount corresponding to a length of an arc that the engaging edge occupies in a circumference of the inner periphery of the shaft tube. In this state, the contact tip of the digitizer refill attains a position of protruding from the opening at the tip end of the shaft tube. A maximum distance that the knock member moves to this state is the aforementioned distance X.

Because this distance X is shorter than the aforementioned distance A, even though the knock member is pressed by the distance X, the stepped tip portion of the digitizer refill does not abut against the inner surface of the shaft tube.

Next, in the state in which the sliding ridge of the rotary member is engaged with the engaging edge at the time when the digitizer refill is installed in the shaft tube, or in the state in which the sliding ridge is engaged with the engaging edge by a knock operation, when the knock member is pressed, the rotary member is again pushed forward. In this case, the knock member has to be pressed by the distance L or more for the sliding ridge to pass the guide edge. However, in the state in which the contact tip protrudes from the opening at the tip end of the shaft tube, the distance in the axial direction from the stepped tip portion of the digitizer refill to the inner surface at the tip end side of the shaft tube is B.

Because the distance B is longer than the distance L corresponding to a step between the engaging edge and the guide edge, the sliding ridge would move by the distance L or more before the knock member is pressed by the distance B. Meanwhile, the stepped tip portion of the digitizer refill does not abut against the inner surface of the shaft tube. Then the sliding ridge reaches the guide edge and moves along the inclination thereof to the next cam groove. At this time, the rotary member rotates by an amount corresponding to a length of the guide edge and the arc that the cam groove adjacent to the guide edge occupies in the circumference of the inner periphery of the shaft tube, and the knock member is pushed rearward by the urging force of the return spring. Accordingly, the sliding ridge is disposed in the cam groove.

(3) Third Aspect

In a third aspect of the present invention, in addition to the features of the first or second aspect, the digitizer refill is to be used for input by an electromagnetic induction system, the electromagnetic induction system includes a ferrite core disposed at an axial center, an electromagnetic induction coil disposed at an outer periphery of the ferrite core, the contact tip mounted at a tip end of the ferrite core, and a pressure sensor that senses pressure applied to the contact tip, and the stepped tip portion is a tip end of the electromagnetic induction coil.

In the third aspect, a tip edge of the electromagnetic induction coil corresponds with the stepped tip portion. Therefore, the tip edge of the electromagnetic induction coil is not abutted against the inner surface at the tip end side of the shaft tube by the knock operation, and consequently damage to the electromagnetic induction coil from the knock operation may be avoided.

(4) Fourth Aspect

In a fourth aspect of the present invention, in addition to the features of any of the first to third aspects, a stabilizing member is interposed between an outer surface of the digitizer refill and an inner surface of the shaft tube, the stabilizing member reducing an amplitude of lateral swaying of the digitizer refill inside the shaft tube, and the stabilizing member is attached to the shaft tube side.

The stabilizing member is a member interposed between the shaft tube and the digitizer refill inside the shaft tube at the shaft tube side in order to reduce clearance in which the digitizer refill might swing in an diameter direction in the shaft tube. A material of the stabilizing member is a synthetic material such as polyethylene, polypropylene or the like, and in order to produce greater effects, may be formed of a viscoelastic material such as a silicone robber, a thermoplastic elastomer or the like.

By the stabilizing member being provided, impacts on the digitizer refill, which accommodates electronic components, due to vibrations, falls and the like may be moderated and incidences of malfunction, operational failure and the like due to internal damage and disconnections may be reduced.

(5) Fifth Aspect

In a fifth aspect of the present invention, in addition to the features of any of the first to fourth aspects, the digitizer refill is formed replaceably.

(6) Sixth Aspect

In a sixth aspect of the present invention, in addition to the features of any of the first to fifth aspects, the digitizer refill can be replaced in the shaft tube with a writing refill of substantially the same size as the digitizer refill.

The "writing refill of substantially the same size" referred to herein means a compatible refill but does not necessarily need to be precisely the same size. Types of writing may include ball pens, mechanical pencils, solid leads and marker pens. The meaning of the term "writing refill" is intended to encompass refills that do not actually write by drawing lines, including refills for purposes of erasing lines such as erasers and friction implements, pressure-sensing touch pen refills and so forth.

Advantageous Effects of Invention

Because aspects of the present invention are structured as described above, an input touch pen may be provided that may prevent damage to a digitizer refill at a time of knock operation, enable easy protrusion and retraction of a tip end, and may protect the tip end when not in use.

BRIEF DESCRIPTION OF DRAWINGS

FIG. 2A is an elevation view of a digitizer refill to be installed in a shaft tube of the input touch pen according to the first exemplary embodiment of the present invention.

FIG. 2B is a side view of the digitizer refill to be installed in the shaft tube of the input touch pen according to the first exemplary embodiment of the present invention.

FIG. 2C is a side sectional view of the digitizer refill to be installed in the shaft tube of the input touch pen according to the first exemplary embodiment of the present invention.

FIG. 3B is a side view of the rear shaft tube.

FIG. 3C is a side sectional view of the rear shaft tube.

FIG. 4A is an elevation view of a state after a knock member is pressed from the state in FIG. 1A.

FIG. 9A is a partial perspective view of operation of a knock mechanism according to the second exemplary embodiment of the present invention.

FIG. 9C is a partial perspective view of the operation of the knock mechanism according to the second exemplary embodiment of the present invention.

FIG. 9D is a partial perspective view of the operation of the knock mechanism according to the second exemplary embodiment of the present invention.

FIG. 9E is a partial perspective view of the operation of the knock mechanism according to the second exemplary embodiment of the present invention.

FIG. 9H is a partial perspective view of the operation of the knock mechanism according to the second exemplary embodiment of the present invention.

FIG. 9I is a partial perspective view of the operation of the knock mechanism according to the second exemplary embodiment of the present invention.

FIG. 10A is a side view of an input touch pen according to a third exemplary embodiment of the present invention when a contact tip is retracted.

DETAILED DESCRIPTION

(1) First Exemplary Embodiment

A first exemplary embodiment of the present invention is described with reference to the drawings.

Figure 1A:
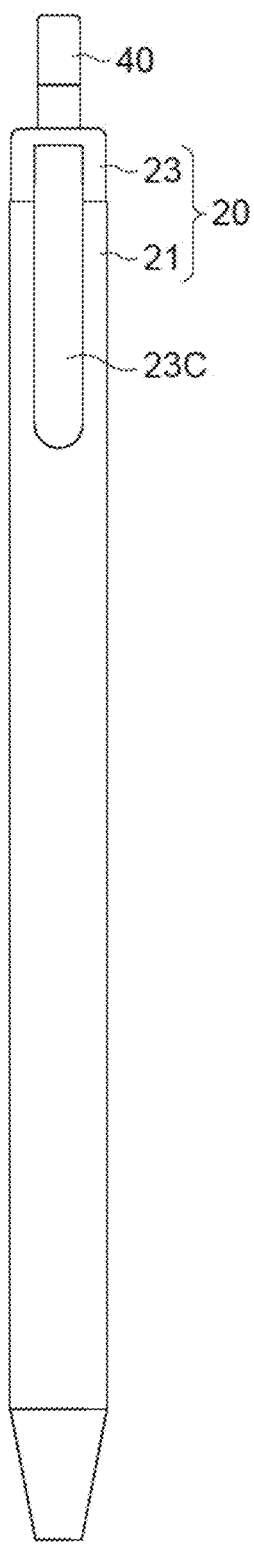
FIG. 1A is an elevation view of an input touch pen according to a first exemplary embodiment of the present invention.
Figure 1B:
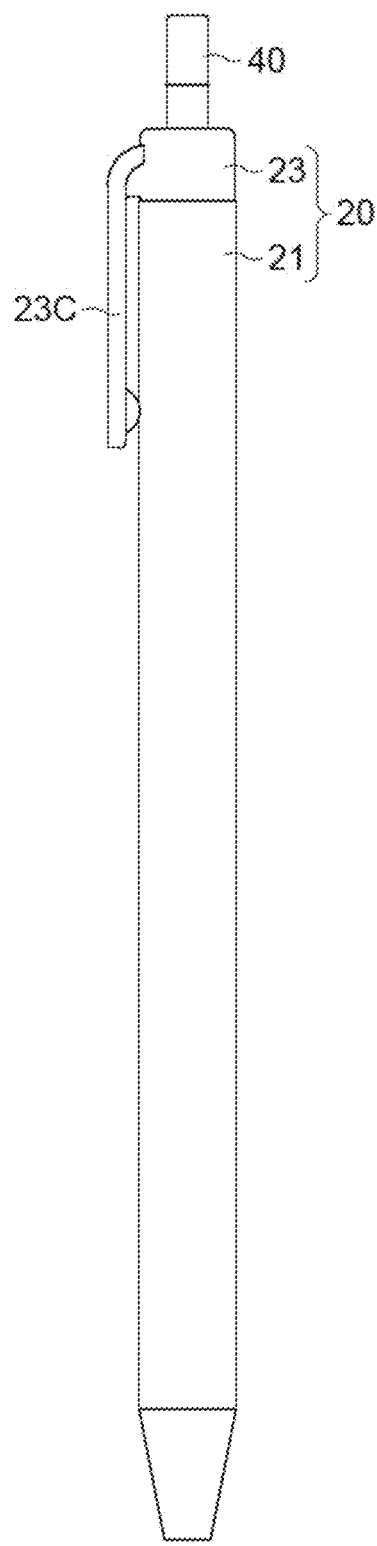
FIG. 1B is a side view of the input touch pen according to the first exemplary embodiment of the present invention.
Figure 1C:
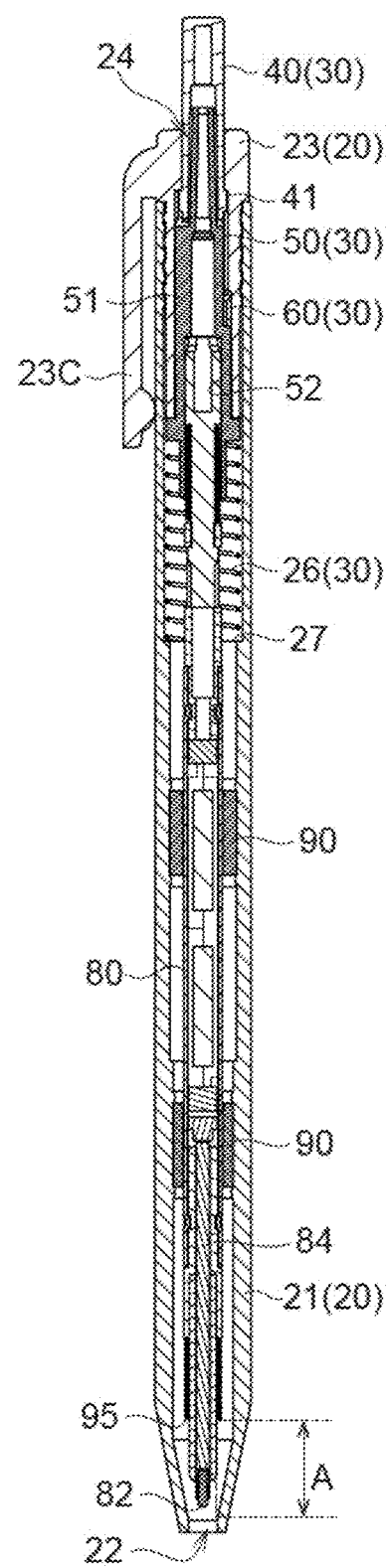
FIG. 1C is a side sectional view of the input touch pen according to the first exemplary embodiment of the present invention.

FIG. 1A, FIG. 1B and FIG. 1C are, respectively, an elevation view, a side view and a side sectional view of an input touch pen 10 according to the present exemplary embodiment. A shaft tube 20 is provided with a knock member 40 and a rotary member 50, and is formed by a tip shaft tube 21 and a rear shaft tube 23 being screwed together. A clip 23C protrudes from a side surface of the rear shaft tube 23. The knock member 40 serves as a knock button and protrudes from an opening 24 at a rear end of the shaft tube 20. The rotary member 50 is disposed in front of the knock member 40 inside the shaft tube 20. A rear end portion of the rotary member 50 is inserted into an interior cavity of the knock member 40. A refill mounting hole 52 is provided at an axial center of the rotary member 50. A plurality of sliding projections 41 are equally distributed around and protrude outward from a tip end vicinity of the knock member 40. A plurality of sliding ridges 51 whose length directions lie along an axis are equally distributed around and protrude outward from a rear end side of an outer surface of the rotary member 50. Positional relationships of the sliding projections 41 and sliding ridges 51 and operations thereof are described in more detail below.

A border, which specified at a location a little to the rear from a middle of the tip shaft tube 21, an inner diameter at the tip end side of the border being smaller than an inner diameter at the rear end side of the border, is formed as a spring support step 27. A return spring 26 is interposed between the spring support step 27 and the rotary member 50. The return spring 26 urges the spring support step 27 and the rotary member 50 in directions away from each other. A cam mechanism 60 is provided at an inner surface of the rear shaft tube 23. The cam mechanism 60 is described in more detail below.

A digitizer refill 80 is installed inside the shaft tube 20. As shown in FIG. 2A, FIG. 2B and FIG. 2C, a tip joint 81 incorporating a rod-shaped ferrite core 84 is attached to a tip end of an accommodation tube 83 fabricated of metal. The tip joint 81 is fabricated of a synthetic resin such as, for example, polypropylene. A contact tip 82 is attached to a tip end of the tip joint 81. The contact tip 82 is fabricated of a synthetic resin such as, for example, polyacetal. An electromagnetic induction coil 85 is wound round the periphery of the ferrite core 84, with the tip joint 81 sandwiched therebetween. A tip edge of the electromagnetic induction coil 85 is a stepped tip portion 95. A pressure sensor 86 and a condenser 87, which are electronically connected with the electromagnetic induction coil 85, are accommodated in the accommodation tube 83. A fixed portion 88 is attached to the rear end of the accommodation tube 83. A return spring 89 that urges the accommodation tube 83 in the tip end direction is attached. The return spring 89 is compressed when the accommodation tube 83 is moved rearward by pushing of the tip joint 81. The digitizer refill 80 is detachably and tightly inserted into the rotary member 50 at the fixed portion 88. Thus, the digitizer refill 80 can be easily replaced with a new one when the contact tip 82 is worn or electronic components accommodated therein become our of order.

Stabilizing members 90 are attached at two locations of the interior of the tip shaft tube 21. The stabilizing members 90 are tubular members formed of a silicone rubber material. Clearances between the stabilizing members 90 and the digitizer refill 80 are narrower than distances between the digitizer refill 80 and the inner peripheral surface of the tip shaft tube 21. Therefore, an amplitude of lateral swinging of the digitizer refill 80 inside the shaft tube 20 is reduced by the stabilizing members 90.

In the state shown in FIG. 1C, the contact tip 82 does not protrude from an opening 22 at the tip end of the shaft tube 20 but is retracted. In this state, the fixed portion 88 of the digitizer refill 80 is tightly inserted into and fixed at the refill mounting hole 52 of the rotary member 50.

In this state, a distance in the axial direction from the stepped tip portion 95 that is a tip edge of the electromagnetic induction coil 85 of the digitizer refill 80, to an inner surface at the tip end side of the shaft tube 20 is represented by A.

Figure 3A:
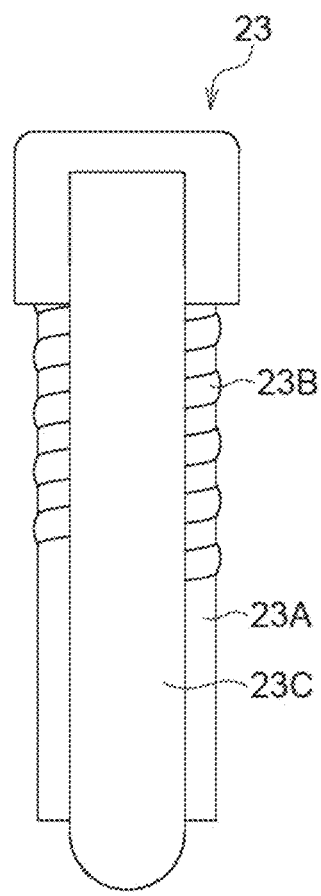
FIG. 3A is an elevation view of a rear shaft tube.
Figure 3D:
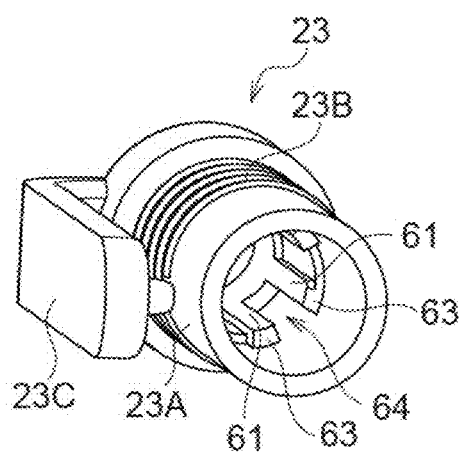
FIG. 3D is a bottom side perspective view of the rear shaft tube.
Figure 3E:
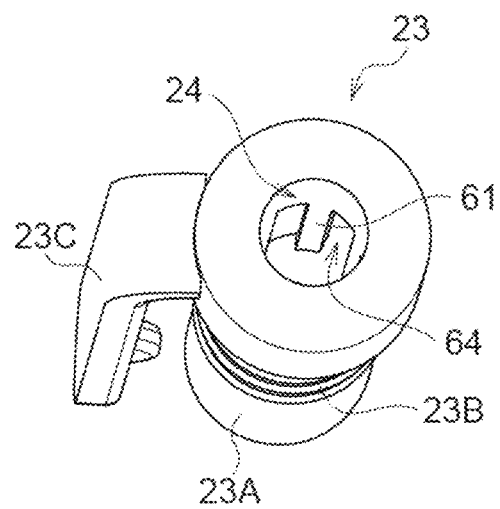
FIG. 3E is a plan side perspective view of the rear shaft tube.

FIG. 3A, FIG. 3B, FIG. 3C, FIG. 3D and FIG. 3E are, respectively, an elevation view, a side view, a side sectional view, a bottom side perspective view and a plan side perspective view of the rear shaft tube 23. A front side 23A of the rear shaft tube 23 has a smaller diameter, and a male thread 23B is formed at an outer peripheral surface of the front side 23A. The male thread 23B is screwed into the rear end of the tip shaft tube 21. A plurality of engaging ridges 61 are equally distributed around and formed so as to protrude inward from an inner peripheral surface of the shaft tube 20. Each engaging ridge 61 includes an engaging edge 62 and a guide edge 63, which are tip end surfaces of the engaging ridge 61 and are inclined relative to a rotation direction. Each engaging edge 62 locates rearward relative to each guide edge 63. Each engaging edge 62 locates at a reverse direction side of the rotation direction. Each guide edge 63 locates at a forward direction side of the rotation direction. Groove-shaped spaces between the engaging ridges 61 serve as cam grooves 64. That is, a plurality of cam grooves 64 are also equally distributed. As shown in FIG. 3C, a distance between the rearmost end of each engaging edge 62 and the tipmost end of each guide edge 63 is a distance L.

Figure 4B:
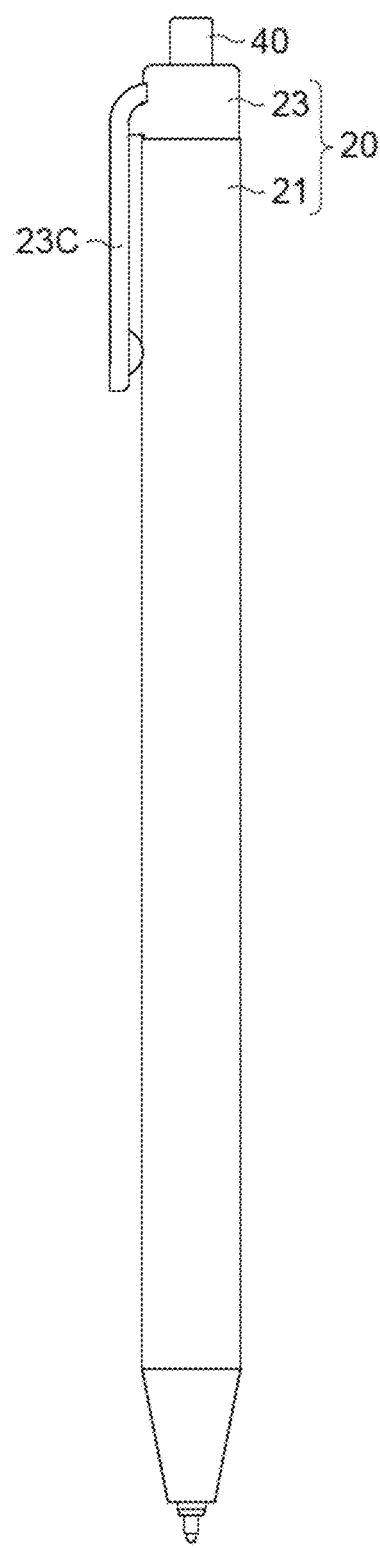
FIG. 4B is a side view of the state after the knock member is pressed from the state in FIG. 1B.
Figure 4C:
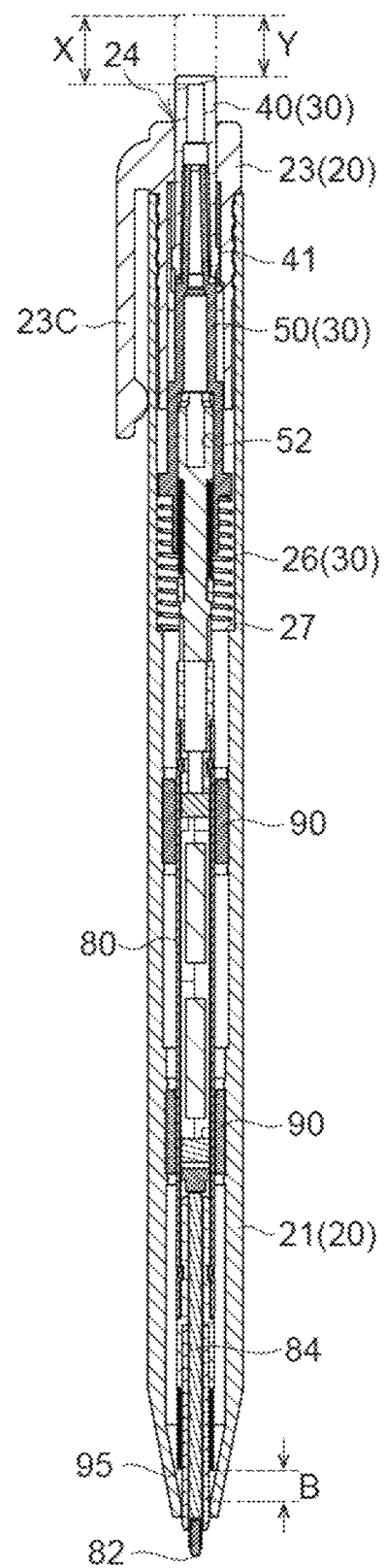
FIG. 4C is a side sectional view of the state after the knock member is pressed from the state in FIG. 1C.

FIG. 4A, FIG. 4B and FIG. 4C are, respectively, an elevation view, a side view and a side sectional view of a state after the knock member 40 is pressed and the contact tip 82 protrudes from the opening 22 at the tip end of the shaft tube 20 from the state in FIG. 1A, FIG. 1B and FIG. 1C. A maximum distance that the knock member 40 can be moved from the state in FIG. 1C is represented by X and a distance from the state in FIG. 1C to the state in which the contact tip 82 protrudes is represented by Y. The distance X is a sum of the distance Y and the above-mentioned distance L (see FIG. 3C) or more. In the state in FIG. 4A, FIG. 4B and FIG. 4C, a distance in the axial direction from the stepped tip portion 95 that is a tip edge of the electromagnetic induction coil 85 of the digitizer refill 80, to the inner surface at the tip end side of the shaft tube 20 is represented by B.

Now, operation of a knock mechanism 30 is described with reference to the partial perspective views in FIG. 5A, FIG. 5B. FIG. 5C, FIG. 5D and FIG. 5E. In these drawings, the rear shaft tube 23 is depicted in half section. Each of rotation directions mentioned in the following descriptions is expressed in a view looking from the tip end side to the rear end side in each drawing.

Figure 5A:
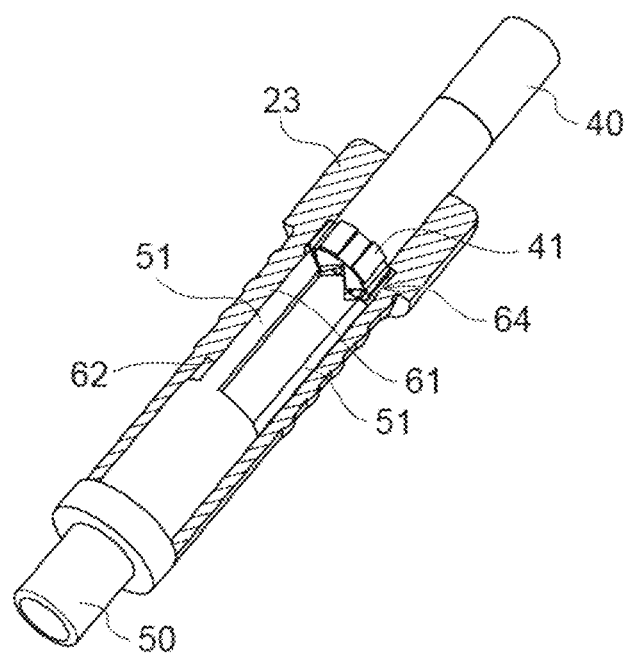
FIG. 5A is a partial perspective view of operation of a knock mechanism according to the first exemplary embodiment of the present invention.

FIG. 5A shows a state in which the contact tip 82 does not protrude from the opening 22 at the tip end of the shaft tube 20 (see FIG. 1A). A plurality of sliding projections 41 formed at the knock member 40 are disposed at a rear side in the cam grooves 64 between the engaging ridges 61, and the sliding ridges 51 of the rotary member 50 are disposed at a front side in the cam grooves 64.

Figure 5B:
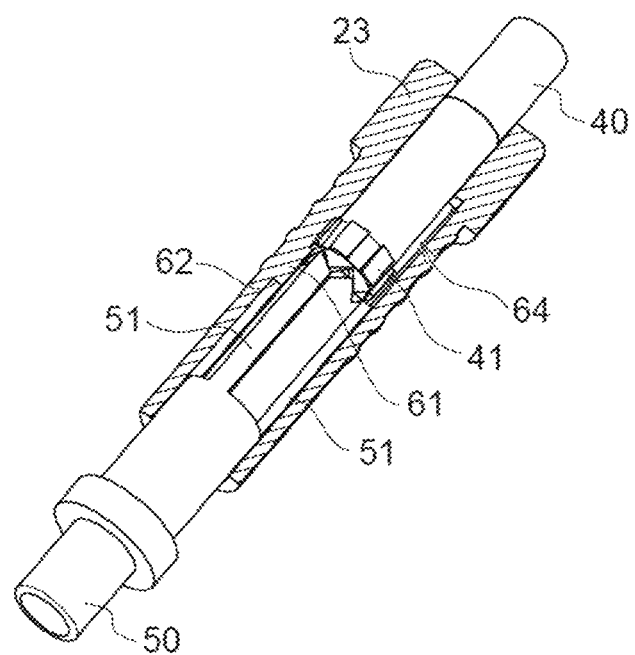
FIG. 5B is a partial perspective view of the operation of the knock mechanism according to the first exemplary embodiment of the present invention.
Figure 5C:
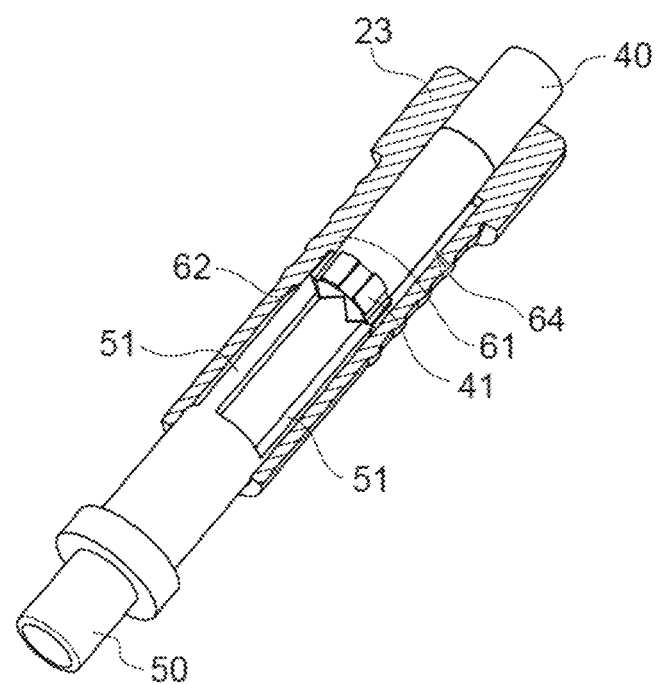
FIG. 5C is a partial perspective view of the operation of the knock mechanism according to the first exemplary embodiment of the present invention.
Figure 5D:
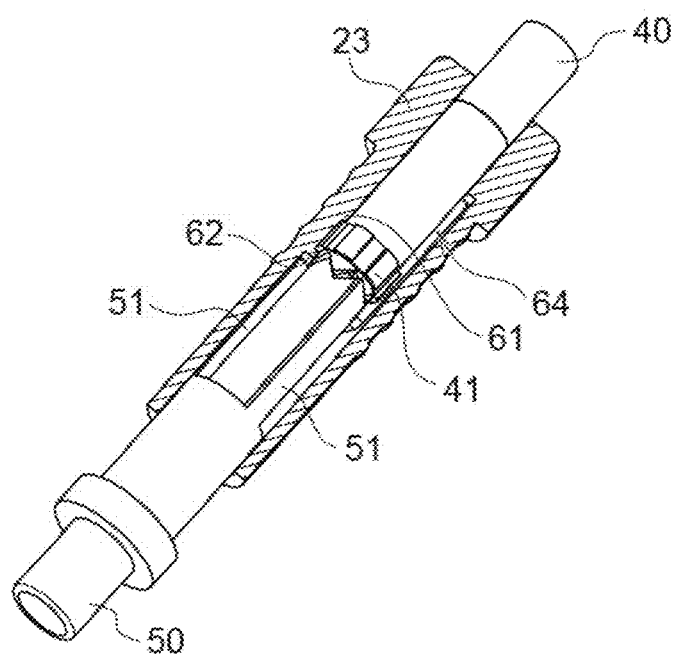
FIG. 5D is a partial perspective view of the operation of the knock mechanism according to the first exemplary embodiment of the present invention.
Figure 5E:
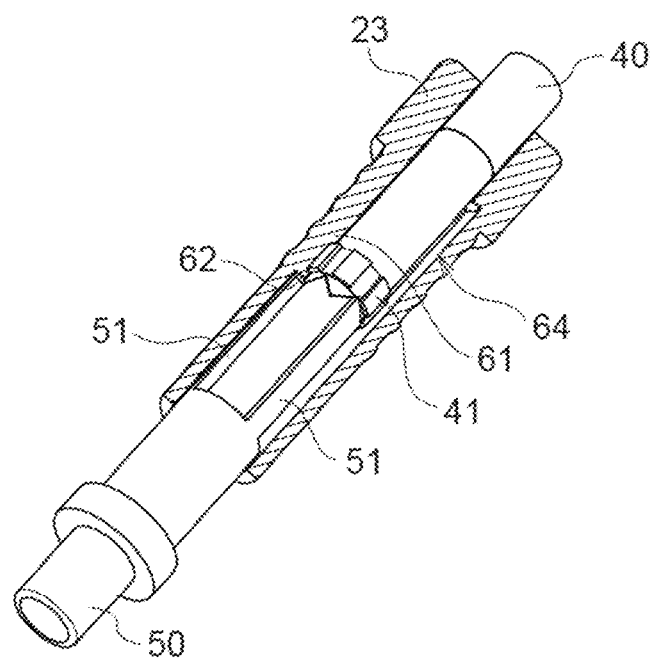
FIG. 5E is a partial perspective view of the operation of the knock mechanism according to the first exemplary embodiment of the present invention.

When the knock member 40 is pressed from the state in FIG. 5A, as shown in FIG. 5B, the sliding ridges 51 are pushed forward in the cam grooves 64 by the sliding projections 41, and the rotary member 50 moves forward. At this time, the stepped tip portion 95 of the digitizer refill 80 does not reach an opening 22 at the tip end of the shaft tube 20.

When the knock member 40 is pressed further from the state in FIG. 5B, a rear end edge of each sliding ridge 51 moves over the engaging edge 62 of the engaging ridge 61 (FIG. 5C), the sliding ridge 51 moves in the counterclockwise direction along the inclination of the engaging edge 62, and the sliding ridge 51 and engaging edge 62 become completely engaged (FIG. 5D). When the sliding ridges 51 rotate, the rotary member 50 similarly rotates by a pitch amount corresponding to a length of each engaging edge 62 in a circumferential direction. An engaging state in which the sliding ridges 51 and the engaging edges 62 are engaged to each other occurs before the stepped tip portion 95 of the digitizer refill 80 abuts at the opening 22 at the tip end of the shaft tube 20. Then, the stepped tip portion 95 of the digitizer refill 80 protrudes from the opening 22 at the tip end of the shaft tube 20 (see FIG. 4A).

When the knock member 40 is pressed from the state shown in FIG. 5D, the rotary member 50 is pushed forward accordingly. A state in which each sliding ridge 51 moves forward toward the guide edge 63 while the engagement with the engaging edge 62 is being disengaged is shown in FIG. 5E.

Before being pushed by the distance B shown in FIG. 4C, the sliding ridge 51 passes over a step between the engaging edge 62 and the guide edge 63, whose length is the distance L (see FIG. 3C) that is shorter than the distance B, and the sliding ridge 51 reaches the guide edge 63. The sliding ridge 51 moves along the inclination of the guide edge 63 and reaches the next cam groove 64 again. At this time, the sliding ridges 51 are pushed back rearward by an urging force of the return spring 26 (see FIG. 4C) and return to the state shown in FIG. 5A, and the contact tip 82 is completely retracted inside the shaft tube 20 (see FIG. 1C).

When the contact tip 82 of the input touch pen 10 in the state shown in FIG. 4C is pressed, the ferrite core 84 of the digitizer refill 80 is also pushed rearward. Thereby, the pressure sensor 86 comes in contact.

Figure 6:
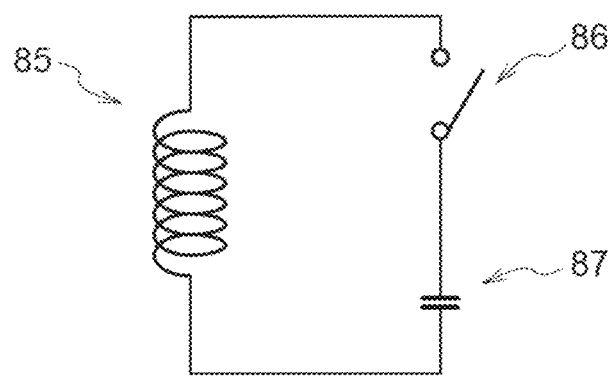
FIG. 6 is a circuit diagram of an electromagnetic induction coil of the input touch pen according to the first exemplary embodiment of the present invention.

The electromagnetic induction coil 85, the condenser 87 and the pressure sensor 86 are formed into a circuit as shown in FIG. 6 by wiring that is not shown in the drawings. When the pressure sensor 86 is in contact, the circuit in FIG. 6 comes in a closed state.

Figure 7:
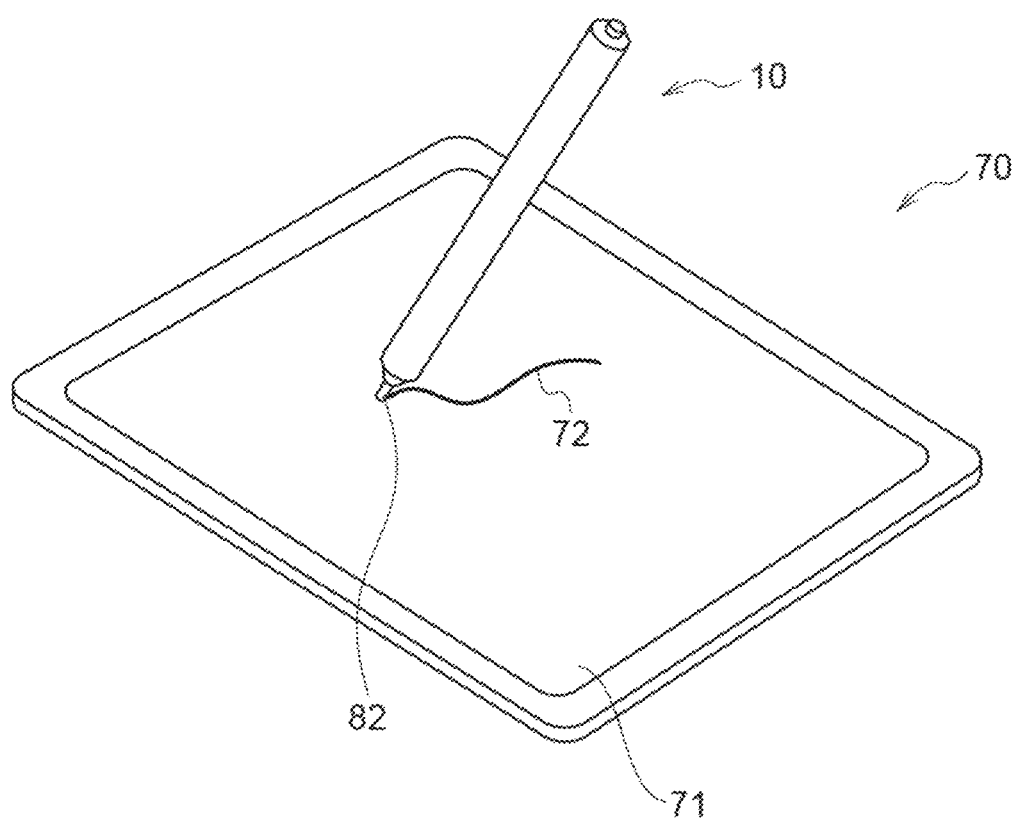
FIG. 7 is a perspective view showing a state of use of the input touch pen according to the first exemplary embodiment of the present invention.

FIG. 7 shows a state of use of the input touch pen 10 according to the present exemplary embodiment. A position detection apparatus that is not shown in the drawings is provided at a lower surface of an input surface 71 of an input device 70. The position detection apparatus generates electromagnetic waves at a particular frequency. When the input surface 71 is traced over by the contact tip 82 of the input touch pen 10 as a drawn line 72 in FIG. 7, the contact tip 82 is pressed. Thereby, the circuit shown in FIG. 6 is closed and current flows in the circuit by electromagnetic induction. The input device 70 identifies a position at which this electromagnetic induction occurs as a coordinate position, and the input device 70 records the drawn line 72 as electronic data.

When the pressure on the contact tip 82 is released, the ferrite core 84 is returned forward by restoring force of the return spring 69, the contact of the pressure sensor 86 is released, and the circuit in FIG. 6 is opened.

(2) Second Exemplary Embodiment

A second exemplary embodiment of the present invention is described with reference to the drawings.

Figure 8A:
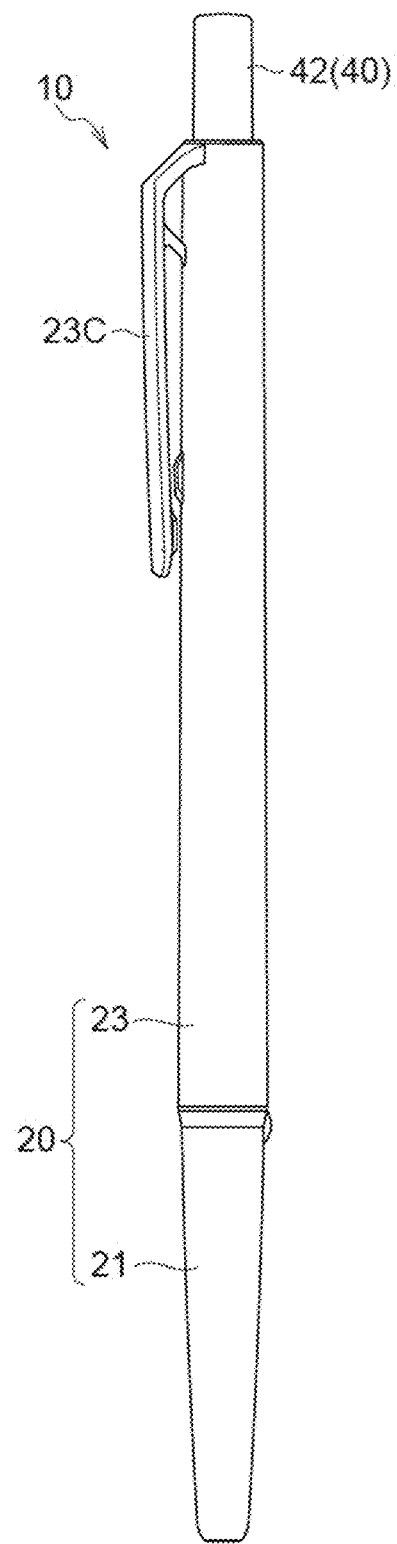
FIG. 8A is a side view of an input touch pen according to a second exemplary embodiment of the present invention.
Figure 8B:
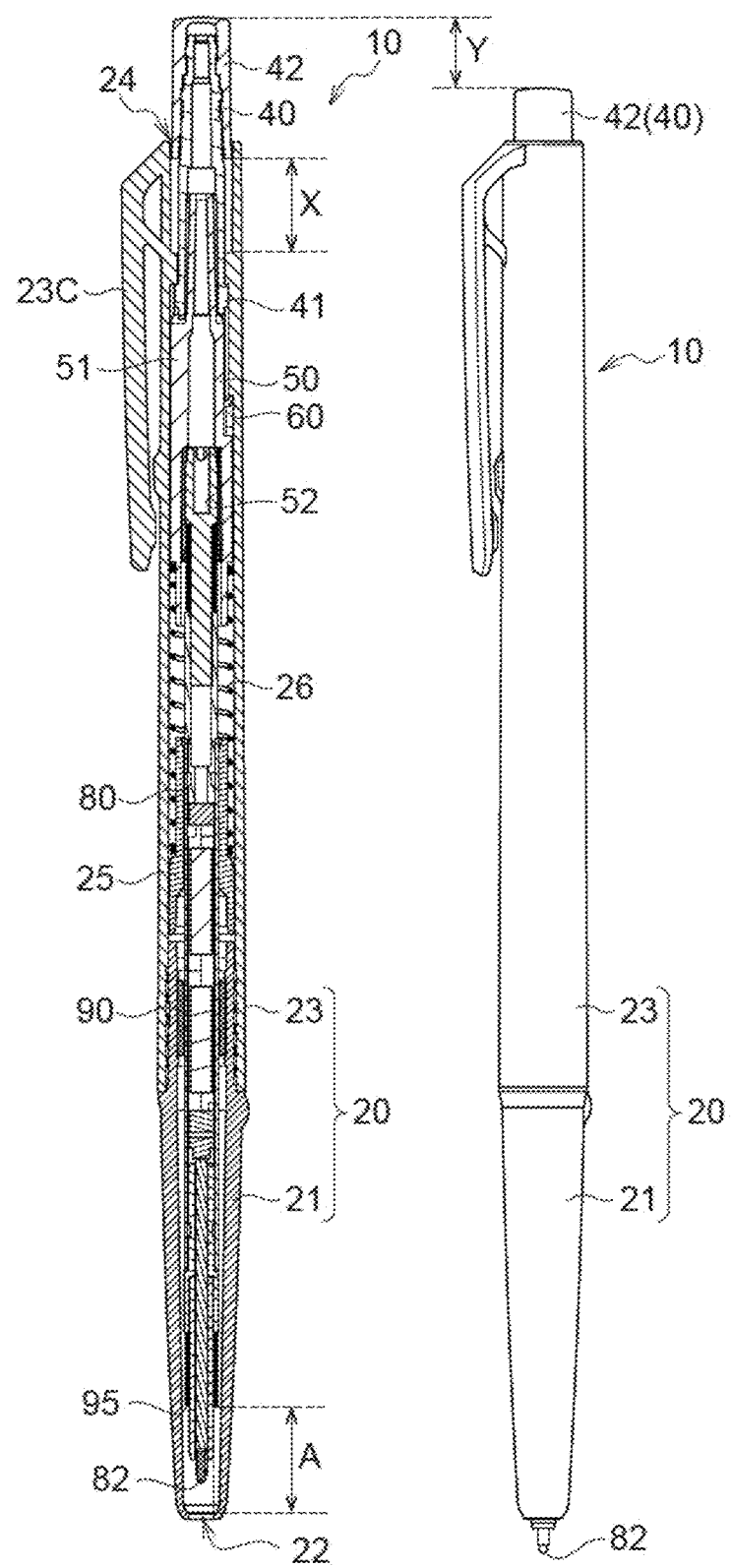
FIG. 8B is a side sectional view and a side view of the input touch pen according to the second exemplary embodiment of the present invention.

FIG. 8A is a side view of an input touch pen 10 according to the present exemplary embodiment. FIG. 8B is a side sectional view and a side view of the input touch pen 10. A shaft tube 20 is formed by a tip shaft tube 21 being screwed to a rear shaft tube 23. A clip 23C protrudes from a side surface of the rear shaft tube 23 in a vicinity of a rear end of the rear shaft tube 23. A knock member 40 protrudes from an opening 24 at the rear end of the shaft tube 20, the knock member 40 is inserted into a knock button 42, and a rotary member 50 is disposed in front of the knock member 40 inside the shaft tube 20. A refill mounting hole 52 is provided at an axial center of the rotary member 50. A fixed portion 88 of a digitizer refill 80 is tightly pressed into the refill mounting hole 52. A plurality of sliding ridges 41 are equally distributed around and protrude outward from a tip end vicinity of the knock member 40. A plurality of sliding ridges 51 whose length directions lie along an axis are equally distributed around and protrude outward from a rear end side of an outer surface of the rotary member 50. Details of positional relationships of the sliding projections 41 and sliding ridges 51 and operations thereof are similar to those of the first exemplary embodiment.

A spring support member 25 is inserted at a position in the rear shaft tube 23 adjacent to the rear end of the tip shaft tube 21, from the tip end side of the rear shaft tube 23. The return spring 26 is interposed between the spring support member 25 and the rotary member 50. The return spring 26 urges the spring support member 25 and the rotary member 50 in directions away from each other. The cam mechanism 60 is provided at the inner surface of a rear end vicinity of the shaft tube 20. Details of the cam mechanism 60 are similar to that of the first exemplary embodiment. The knock member 40, the rotary member 50, the cam mechanism 60 and the return spring 26 constitute the knock mechanism 30. The digitizer refill 80, which is similar to that of the first exemplary embodiment, is installed inside the shaft tube 20.

Now, operation of the knock mechanism 30 according to the second exemplary embodiment is described with reference to the partial perspective views in FIG. 9A, FIG. 9B, FIG. 9C, FIG. 9D, FIG. 9E, FIG. 9F, FIG. 9G, FIG. 9H and FIG. 9I. In these drawings, portions of the shaft tube 20 other than portions corresponding with thicknesses of engaging ridges 61 are not depicted. Each of rotation directions mentioned in the following descriptions is expressed in a view looking from the tip end side to the rear end side in each drawing.

FIG. 9A shows a state in which the contact tip 82 does not protrude from the opening 22 at the tip end of the shaft tube 20 (see FIG. 5A). The sliding projections 41 of the knock member 40 are disposed at a rear side in the cam grooves 64 between the engaging ridges 61, and the sliding ridges 51 of the rotary member 50 are disposed at the front side in the cam grooves 64.

Figure 9B:
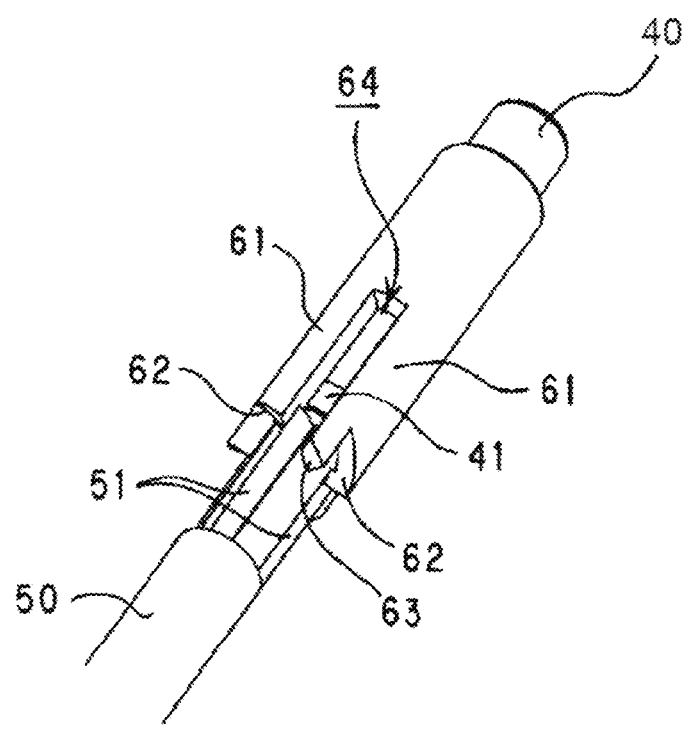
FIG. 9B is a partial perspective view of the operation of the knock mechanism according to the second exemplary embodiment of the present invention.

When the knock member 40 is pressed from the state in FIG. 9A, as shown in FIG. 9B, the sliding ridges 51 are pushed forward in the cam grooves 64 by the sliding projections 41, and the rotary member 50 moves forward. At this time, a stepped tip portion 95 of the digitizer refill 80 does not reach the opening 22 at the tip end of the shaft tube 20.

When the knock member 40 is pressed further from the state in FIG. 9B, the rear end edge of each sliding ridge 51 moves over the engaging edge 62 of the engaging ridge 61 (FIG. 9C). At this time, the knock member 40 moves through a distance X (see FIG. 8B), which is a maximum knock stroke of the digitizer refill 80. Directly thereafter, the sliding ridge 51 moves in the counterclockwise direction along the inclination of the engaging edge 62 (FIG. 9D), and the sliding ridge 51 and engaging edge 62 become completely engaged (FIG. 9E). When the sliding ridges 51 rotate, the rotary member 50 similarly rotates by a pitch amount corresponding to the length of each engaging edge 62 in a circumferential direction. An engaging state in which the sliding ridge 51 and the engaging edge 62 are engaged to each other occurs as shown in FIG. 9E while the stepped tip portion 95 of the digitizer refill 80 moves through a distance A (see FIG. 8B) before the stepped tip portion 95 would abut against the opening 22 at the tip end of the shaft tube 20. Then, the stepped tip portion 95 protrudes from the opening 22 of the tip end of the shaft tube 20. At this time, the knock member 40 moves forward a distance Y from the position before the start of pressing (see FIG. 8B).

Figure 9F:
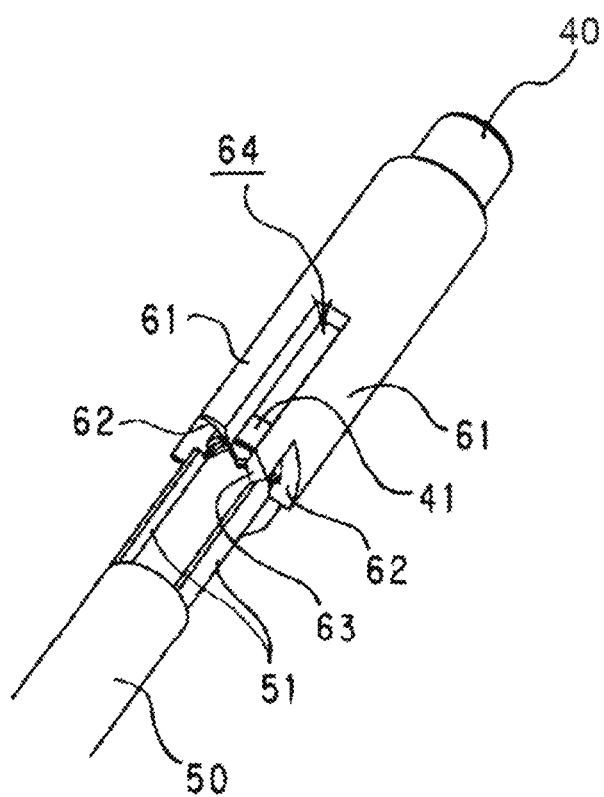
FIG. 9F is a partial perspective view of the operation of the knock mechanism according to the second exemplary embodiment of the present invention.
Figure 9G:
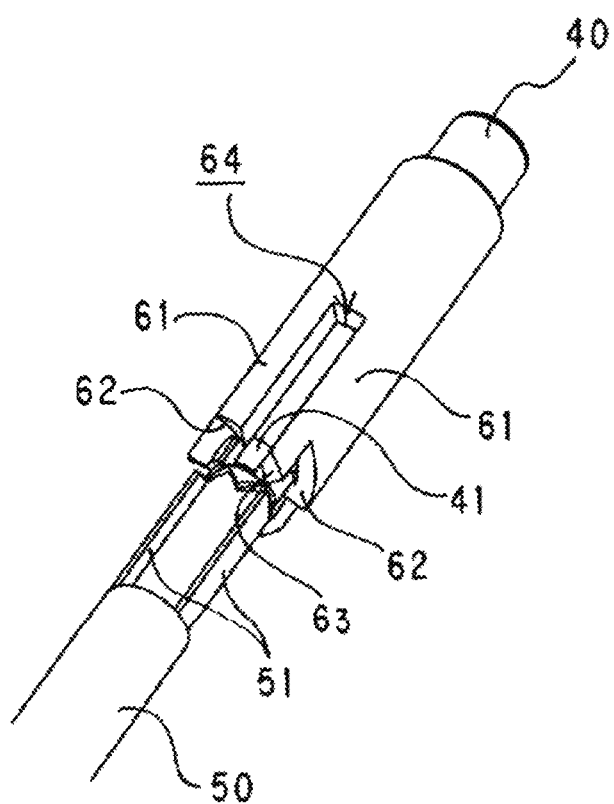
FIG. 9G is a partial perspective view of the operation of the knock mechanism according to the second exemplary embodiment of the present invention.
Figure 91:
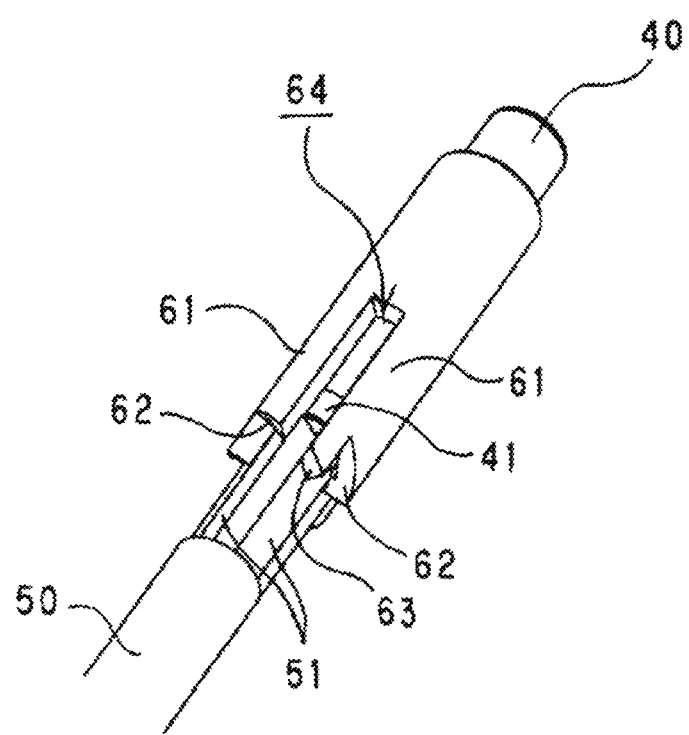

When the knock member 40 is pressed from the state shown in FIG. 9E, the rotary member 50 is pushed forward accordingly. A state in which each sliding ridge 51 moves forward toward the guide edge 63 while the engagement with the engaging edge 62 is being disengaged is shown in FIG. 9F.

Before being pushed by a distance B (see FIG. 4C), the sliding ridge 51 passes along the step between the engaging edge 62 and the guide edge 63 (FIG. 9G), whose length is the distance L that is shorter than the distance B (see FIG. 3C), and the sliding ridge 51 reaches the guide edge 63 (FIG. 9H). The sliding ridge 51 moves along the angle of the guide edge 63 and reaches the next cam groove 64 (FIG. 9I). At this time, the sliding ridges 51 are pushed back rearward by an urging force of the return spring 26 and are returned to the state shown in FIG. 9A, and the contact tip 82 is completely retracted inside the shaft tube 20.

The knock operation and state of use according to the present exemplary embodiment are similar to those of the first exemplary embodiment. The stabilizing member 90 is mounted inside the tip shaft tube 21 that is screwed together with the rear shaft tube 23. The stabilizing member 90 is a tubular member that is formed of a synthetic material such as polyethylene, polypropylene or the like or more preferably of a viscoelastic material such as a silicone rubber, a thermoplastic elastomer or the like. Clearance between the stabilizing member 90 and the digitizer refill 80 is narrower than distances between the digitizer refill 80 and the inner peripheral surface of the tip shaft tube 21. Therefore, an amplitude of lateral swinging of the digitizer refill 80 inside the shaft tube 20 is reduced by the stabilizing member 90. In the present exemplary embodiment, because space around the digitizer refill 80 is also reduced at locations of the spring support member 25, the spring support member 25 may provide a similar effect to the stabilizing member 90.

(3) Third Exemplary Embodiment

A third exemplary embodiment of the present invention is described with reference to the drawings.

Figure 10B:
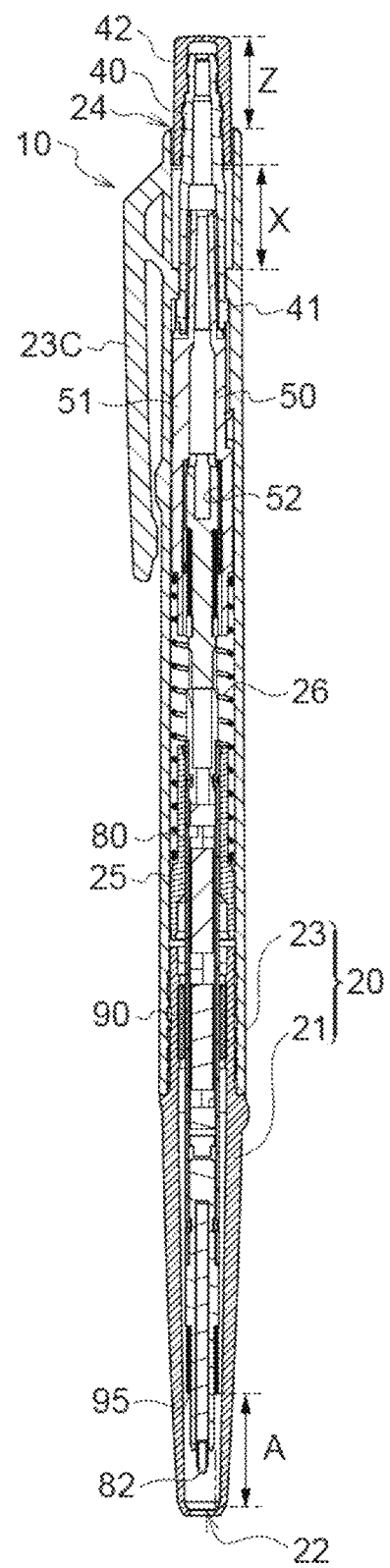
FIG. 10B is a side sectional view of the input touch pen according to the third exemplary embodiment of the present invention when the contact tip is retracted.
Figure 10C:
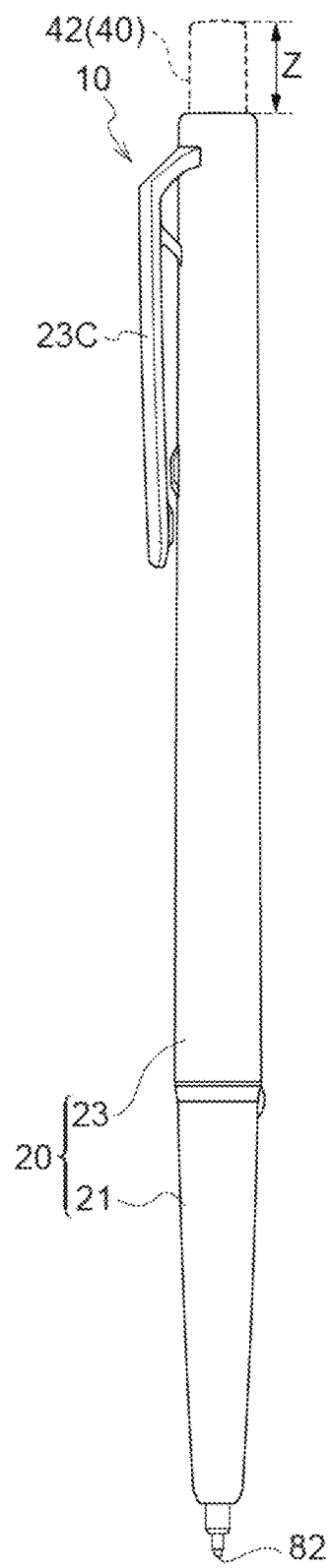
FIG. 10C is a side view of the input touch pen according to the third exemplary embodiment of the present invention when a knock button is maximally pressed.
Figure 10D:
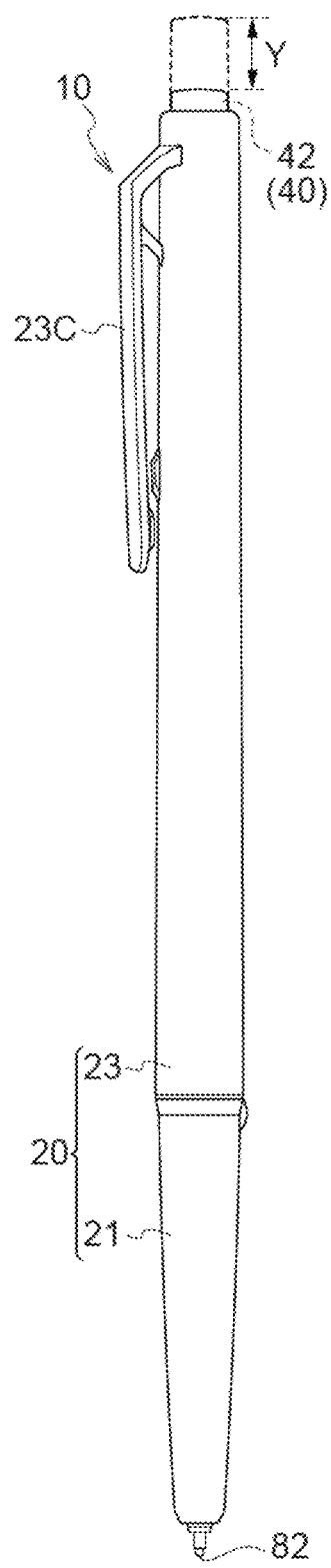
FIG. 10D is a side view of the input touch pen according to the third exemplary embodiment of the present invention when the contact tip protrudes.

FIG. 10A and FIG. 10B are, respectively, a side view and a side sectional view of an input touch pen 10 according to the present exemplary embodiment. FIG. 10C and FIG. 10D are, respectively, a side view of the input touch pen 10 when a knock button 42 is maximally pressed and a side view of the input touch pen 10 when a contact tip 82 protrudes.

A knock member 40 protrudes from an opening 24 at a rear end of a shaft tube 20, and the knock member 40 is inserted into the knock button 42. A maximum knock stroke of a digitizer refill 80, which is a distance X, is specified as a maximum distance that the knock member 40 can move when the contact tip 82 is retracted (see FIG. 10B). The distance X is shorter than a distance A in which the stepped tip portion 95 of the digitizer refill 80 abuts at the opening 22 at the tip end of the shaft tube 20. On the other hand, an external dimension Z of the knock button 42 from the rear end of the shaft tube 20 when the contact tip 82 is retracted is specified to be shorter than the distance X.

Figure 11A:
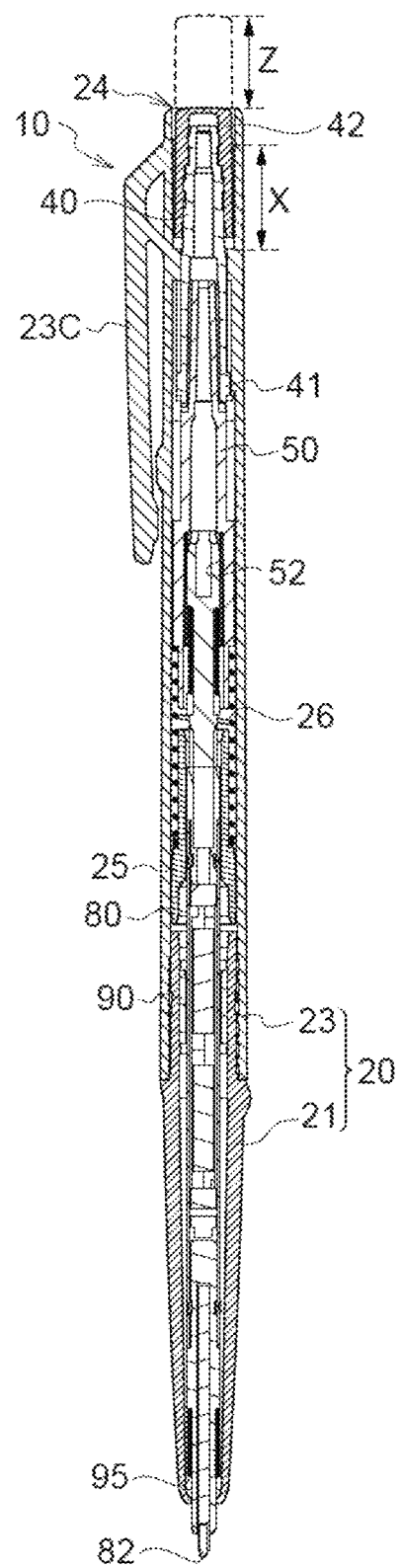
FIG. 11A is a side sectional view of the input touch pen according to the third exemplary embodiment of the present invention when the knock button is maximally pressed.

Therefore, as illustrated in FIG. 10C, the knock member 40 can only move as far as a position at which a finger pressing the knock member 40 abuts against the rear end of the shaft tube 20, and the knock member 40 cannot move through the distance X (see FIG. 11A). In other words, the knock member 40 can move forward only by a distance corresponding to the external dimension Z of the knock button 42. Because the external dimension Z is shorter than the distance X, which is shorter than the distance A as mentioned above, the stepped tip portion 95 is not moved through the distance A by pressing of the knock member 40. Therefore, the stepped tip portion 95 does not make contact with the inner surface at the tip end side of the shaft tube 20.

Figure 11B:
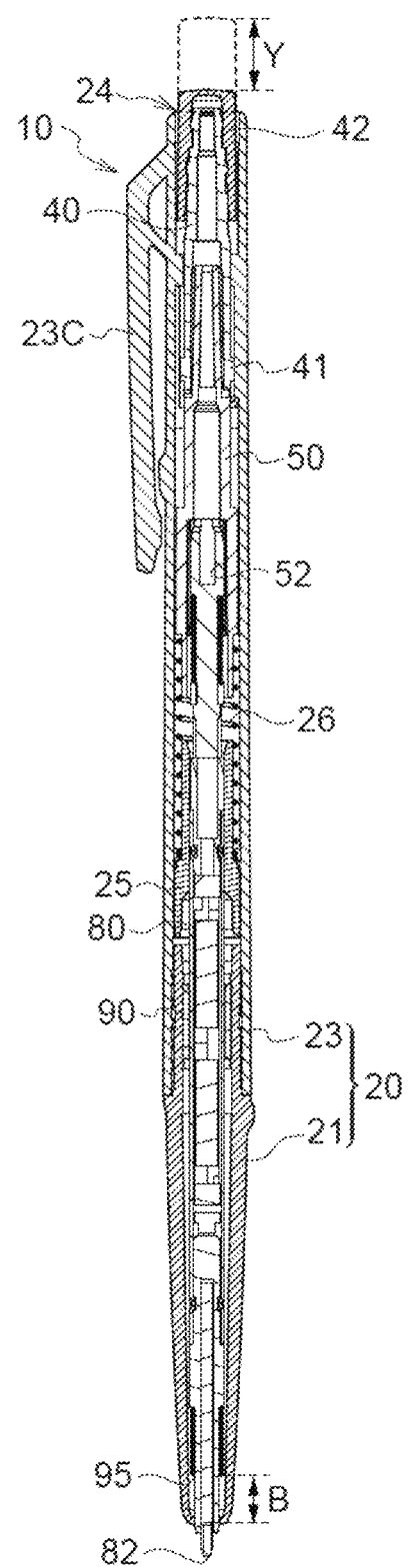
FIG. 11B is a side sectional view of the input touch pen according to the third exemplary embodiment of the present invention when the contact tip protrudes.

When the contact tip 82 protrudes, the knock member 40 is a little pushed back rearward by a restoring force of a return spring 26, and rear ends of sliding ridges 51 come into the state of engagement with engaging edges 62 of a cam mechanism 60 (see FIG. 3C). Here, a distance Y in which the knock member 40 moves from when the contact tip 82 is retracted (see FIG. 10D) is inherently shorter than the external dimension Z (see FIG. 10C). A distance B between the stepped tip portion 95 and the inner surface at the tip end side of the shaft tube 20 in this state (see FIG. 11B) is longer than a distance L mentioned above (see FIG. 3C). To release the engagement with the cam mechanism 60, the knock member 40 can completely move through the distance L and release the engagement before moving through the distance B. Even if the knock button 42 is maximally pressed at this time, only the state shown in FIG. 10C occurs. Therefore, the stepped tip portion 95 does not come into contact with the inner surface at the tip end of the shaft tube 20. Note that embodiments in which the distance Z is shorter than the distance A are possible.

Details of the positional relationships and operations of other members are similar to the second exemplary embodiment.

INDUSTRIAL APPLICABILITY

The present invention is applicable to an input touch pen including a shaft tube equipped with a knock mechanism.

The invention claimed is:

1. An input touch pen, comprising:
a shaft tube including an opening at each of a tip end and a rear end,
a digitizer refill that is contained inside the shaft tube and includes a contact tip that can protrude and retract through the opening at the tip end; and
a knock mechanism including a knock member that protrudes from the opening at the rear end, wherein:
the knock mechanism includes a return spring that continuously urges the knock member rearward relative to the shaft tube,
a rear portion of the digitizer refill is fixed to the knock mechanism,
a stepped tip portion is formed rearward of the contact tip of the digitizer refill, the stepped tip portion having a larger diameter than an outer diameter of the contact tip and a larger diameter than the opening at the tip end of the shaft tube, and
the relationship A>X>Y is satisfied, wherein:
X represents a maximum knock stroke of the digitizer refill,
A represents a distance in an axial direction from the stepped tip portion to an inner surface at a tip end side of the shaft tube in a state in which the contact tip is retracted inside the opening at the tip end, and
Y represents a distance that the contact tip is moved by operation of the knock member from a state in which the contact tip protrudes from the opening at the tip end, to the state in which the contact tip is retracted inside the opening at the tip end.

2. An input touch pen, comprising:
a shaft tube including an opening at each of a tip end and a rear end,
a digitizer refill that is contained inside the shaft tube and includes a contact tip that can protrude and retract through the opening at the tip end; and
a knock mechanism including a knock member that protrudes from the opening at the rear end, wherein:
the knock mechanism includes:
the knock member,
a rotary member that is disposed at a tip end side of the knock member and is rotatable in a predetermined circumferential direction in association with pressing of the knock member,
a cam mechanism provided at an inner peripheral surface in a vicinity of the rear end of the shaft tube, and
a return spring that continuously urges the rotary member rearward,
the knock member includes a sliding projection protruding from an outer surface of the knock member,
the rotary member includes a sliding ridge protruding from an outer surface of the rotary member, the sliding ridge extending in an axial direction, and a rear end edge of the sliding ridge being inclined in an opposite direction from a rotation direction of the rotary member,
the cam mechanism includes:
a plurality of engaging ridges protruding inward from the inner peripheral surface in the vicinity of the rear end of the shaft tube, the engaging ridges extending in the axial direction and being equally distributed, and
a cam groove formed as a groove between the plurality of engaging ridges,
the sliding projection and the sliding ridge are slidable forward and rearward in the axial direction in the cam groove,
a portion of a tip edge of the engaging ridge that is disposed at a rotation direction side of the cam groove is formed as an engaging edge that is inclined toward the rear end in the rotation direction and that is engageable with a rear end edge of the sliding ridge,
a portion of a tip edge of the engaging ridge that is disposed at an opposite side from the rotation direction side of the cam groove is formed as a guide edge that is closer to the tip end than the engaging edge, that is inclined toward the rear end in the rotation direction, and that guides the sliding ridge into the cam groove,
a stepped tip portion is formed in a vicinity of a tip end of the digitizer refill, the stepped tip portion having a larger diameter than an outer diameter of the contact tip and a larger diameter than the opening at the tip end of the shaft tube, and
the relationships A>X and B>L are satisfied, wherein:
L represents a distance from a rear end of the engaging edge to a tip end of the guide edge,
X represents a maximum knock stroke of the digitizer refill,
A represents a distance in the axial direction from the stepped tip portion to an inner surface at a tip end side of the shaft tube in a state in which the contact tip is retracted inside the opening at the tip end, and
B represents a distance in the axial direction from the stepped tip portion to the inner surface at the tip end side of the shaft tube in a state in which the contact tip protrudes from the opening at the tip end.

3. The input touch pen according to claim 1, wherein:
the digitizer refill is to be used for input by an electromagnetic induction system,
the electromagnetic induction system includes a ferrite core disposed at an axial center, an electromagnetic induction coil disposed at an outer periphery of the ferrite core, the contact tip mounted at a tip end of the ferrite core, and a pressure sensor that senses pressure applied to the contact tip, and
the stepped tip portion is a tip end of the electromagnetic induction coil.

4. The input touch pen according to claim 1, wherein:
a stabilizing member is interposed in the shaft tube between an outer surface of the digitizer refill and an inner surface of the shaft tube, the stabilizing member reducing an amplitude of lateral swaying of the digitizer refill inside the shaft tube, and the stabilizing member is attached to the shaft tube side.

5. The input touch pen according to claim 1, wherein the digitizer refill is formed replaceably.

6. The input touch pen according to claim 1, wherein the digitizer refill can be replaced in the shaft tube with a writing refill of substantially the same size as the digitizer refill.

* * * * *